United States Patent
Lakritz

(12) 
(10) Patent No.: US 6,623,529 B1
(45) Date of Patent: Sep. 23, 2003

(54) MULTILINGUAL ELECTRONIC DOCUMENT TRANSLATION, MANAGEMENT, AND DELIVERY SYSTEM

(76) Inventor: David Lakritz, 1806 Parkwood Dr., San Mateo, CA (US) 94403

( * ) Notice: Subject to any disclaimer, the term of this patent is extended or adjusted under 35 U.S.C. 154(b) by 0 days.

(21) Appl. No.: 09/239,393

(22) Filed: Jan. 28, 1999

Related U.S. Application Data

(60) Provisional application No. 60/075,740, filed on Feb. 23, 1998.

(51) Int. Cl.[7] .......................... G06F 15/00; G06F 17/00; G06F 15/16
(52) U.S. Cl. ........................ 715/536; 709/203; 709/218
(58) Field of Search .............................. 715/536, 500.1; 704/3; 709/217–218, 203; 707/9

(56) References Cited

U.S. PATENT DOCUMENTS

| | | | |
|---|---|---|---|
| 5,329,619 A | | 7/1994 | Page et al. ................... 709/203 |
| 5,625,818 A | | 4/1997 | Zarmer et al. ............... 707/104 |
| 5,751,957 A | * | 5/1998 | Hiroya et al. ................ 709/203 |
| 5,944,790 A | * | 8/1999 | Levy ............................ 709/218 |
| 6,092,035 A | * | 7/2000 | Kurachi et al. ................. 704/3 |
| 6,212,537 B1 | * | 4/2001 | Nosohara ...................... 707/536 |
| 6,418,439 B1 | * | 7/2002 | Papierniak et al. ............ 707/9 |

FOREIGN PATENT DOCUMENTS

| | | |
|---|---|---|
| EP | 0600235 A1 | 6/1994 |
| EP | 0376741 B1 | 10/1995 |
| EP | 0774722 A2 | 5/1997 |
| EP | 0600235 B1 | 2/1998 |
| JP | 9-44502 | 8/1995 |
| JP | 9114852 A | 10/1995 |
| WO | 97/18516 | 5/1997 |
| WO | WO 97/18516 | * 5/1997 ........... G06F/17/28 |

OTHER PUBLICATIONS

Sakaguchi, Tetsuo et al., A browsing tool of multi–lingual documents for users without multi–lingual fonts, ACM Internationsl Conference on Digital Libraries, pp. 63–71, Mar. 1996.*

Digital Announces First Internet Translation Capability, Educational Cyber Playground, Aug. 15, 1997, downloaded from <www.edu–cyberpg.com/Internet/INTERESTING-SITES/TRANSLATION.html> on Aug. 19, 2002, pp. 1–3.*

* cited by examiner

Primary Examiner—Joseph H. Feild
Assistant Examiner—William L. Bashore
(74) Attorney, Agent, or Firm—Glenn Patent Group; Michael A. Glenn; Kirk D. Wong

(57) ABSTRACT

A document localization, management and delivery system in a computer environment. A preferred embodiment of the invention automatically determines the language and country of a Web site visitor and directs the Web server to deliver the appropriate localized content contained in a country/language database to the visitor's browser. The visitor's browser is notified of the proper font and content encoding needed to display the selected language and is allowed to download the font. A toolkit is provided which allows a master site to be built that is language and country-independent. The actual language and country content is placed in a language/country database where it is easily managed and maintained. When a visitor enters the site, the requested document is automatically served in the visitor's language and for the visitor's country by filling in a document template from the master site with the correct language content from the language/country database. A viewer allows the developer to view and debug the document template as it appears to a visitor in any of the available language content from the language/country database.

51 Claims, 12 Drawing Sheets

MULTILINGUAL ELECTRONIC DOCUMENT TRANSLATION, MANAGEMENT, AND DELIVERY SYSTEM

This application claims the benefit of provisional application 60/075,740 filed Feb. 23, 1998.

BACKGROUND OF THE INVENTION

1. Technical Field

The invention relates to the management and delivery of multilingual content in a computer environment. More particularly, the invention relates to the management of monolingual documents, data streams, non-text files, and databases for automatic localization and presentation into target languages in a computer environment.

2. Description of the Prior Art

The surge of growth in Internet access across the world has created the need for multilingual Web sites. The majority of Web sites are created in English which creates a problem for non-English speaking Internet users. This also creates a problem for Web site managers that maintain Web sites that are, or attempt to be, multilingual. The Web site content must be constantly maintained to be up to date and synchronized in all of the languages supported by the Web site.

One approach is shown in PCT International Publication Number WO97/18516 of Flanagan et al., published on May 22, 1997. This application integrates a machine translator in the end user's Web browser. The user selects the desired target language and the Web document retrieved by the browser is then translated by the machine translator. Unfortunately, errors occur in the translation and the appropriate content is not consistently displayed to the user.

An alternative implementation in the above application places pre-translated Web pages on a Web server. The Web server stores all of the translated Web pages locally. The Web site visitor sends a request to the Web server for a page in a specific language. The Web server searches for the pre-translated page that has been stored locally and sends it to the Web visitor's Web browser. This creates a storage and file management problem on the Web server because of the duplication of each entire page of the Web site.

Some search engines on the Internet offer an option to translate the hits that come back from a search query into different languages. The user initiates the translation through a menu selection. The translation is performed automatically by machine.

Japanese Pat. No. 9-114852 is a method for a search unit which takes a search string in a second foreign language and translates it into a first foreign language. The translated search string is used to search the original document which is in the first foreign language.

Japanese Pat. No. 9-44502 is a method wherein a document in a first foreign language is translated into a second foreign language. The two documents are then displayed separately or together through a user interface.

European Pat. No. 0376741B1 issued to Francisco on Oct. 18, 1995, is a method for displaying error messages on a document collating and envelope stuffing machine. Said error messages exist simultaneously in a plurality of languages and are displayed in the language specified by the user. This approach has storage and maintenance problems because each error message must be duplicated in its entirety for each language.

European Pat. Appl. No. EP0774722A2 of Microsoft Corporation published on May 21, 1997, is a method for an information retrieval system that separates the design and content components of a document page. Pages are created with controls that define areas for content to be inserted into said pages.

It would be advantageous to provide a document localization, management and delivery system that automatically serves content in the correct language to a Web site. It would further be advantageous to provide a document localization, management and delivery system that allows the Web site manager to create one site that is easily converted to a plurality of languages without creating an entirely different site for each language, thereby reducing the overall memory requirements and enhancing the maintainability of the system as a whole.

SUMMARY OF THE INVENTION

The invention provides a document localization, management and delivery system. The invention utilizes an intuitive user interface for facilitating the localization of documents, data streams, and non-text files for multilingual Internet Web sites, enabling the Web site manager to incrementally update the language content of a Web site or document, thereby enhancing the maintainability and storage of multilingual electronic content. In addition, the invention utilizes a mechanism for automatic content insertion and delivery to Web site visitors.

A preferred embodiment of the invention automatically determines the language and country of a Web site visitor and directs the Web server to deliver the appropriate localized content contained in one or more country/language databases to the visitor's browser. The visitor's browser is notified of the proper font needed to display the selected language and is allowed to download the font.

A toolkit is provided which allows a master site to be built that is language and country-independent. The actual language content is placed in one or more language/country databases where it is easily managed and maintained. When a visitor enters the site, the requested document is automatically served in the visitor's language and for the visitor's country by filling in a document template from the master site with the correct language content from the language/country database.

A viewer is also provided, allowing the developer to view and debug the document template as it appears to a visitor in any of the available language content from the language/country database.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a document localization, management and delivery system for computer applications. A system according to the invention provides an intuitive user interface for facilitating the localization of documents, data streams, and non-text files for multilingual Internet Web sites, enabling the Web site manager to incrementally update the language content of a Web site or document, thereby enhancing the maintainability and storage of multilingual electronic content. Additionally, a mechanism for automatic content insertion and delivery to Web site visitors is provided. Many existing application programs use approaches that make it difficult for the user to manage and serve multilingual Web site content.

A preferred embodiment of the invention provides a comprehensive suite of three modules that allow a user to build, operate and maintain a multilingual Web site easily and efficiently. The invention enhances an existing Web site by adding advanced multilingual content management and process control capabilities to the customer's Web server. It also uses standard and open interfaces thus enabling the invention to work with all Web servers on supported platforms.

Each module is easy to set up and does not require special modifications to the Web site. The invention provides an easy migration path from early-stage customers who are only interested in measuring overseas visitor traffic to more sophisticated customers who need to manage the rapid translation of changing content on large, distributed multilingual Web sites.

Figure 1:
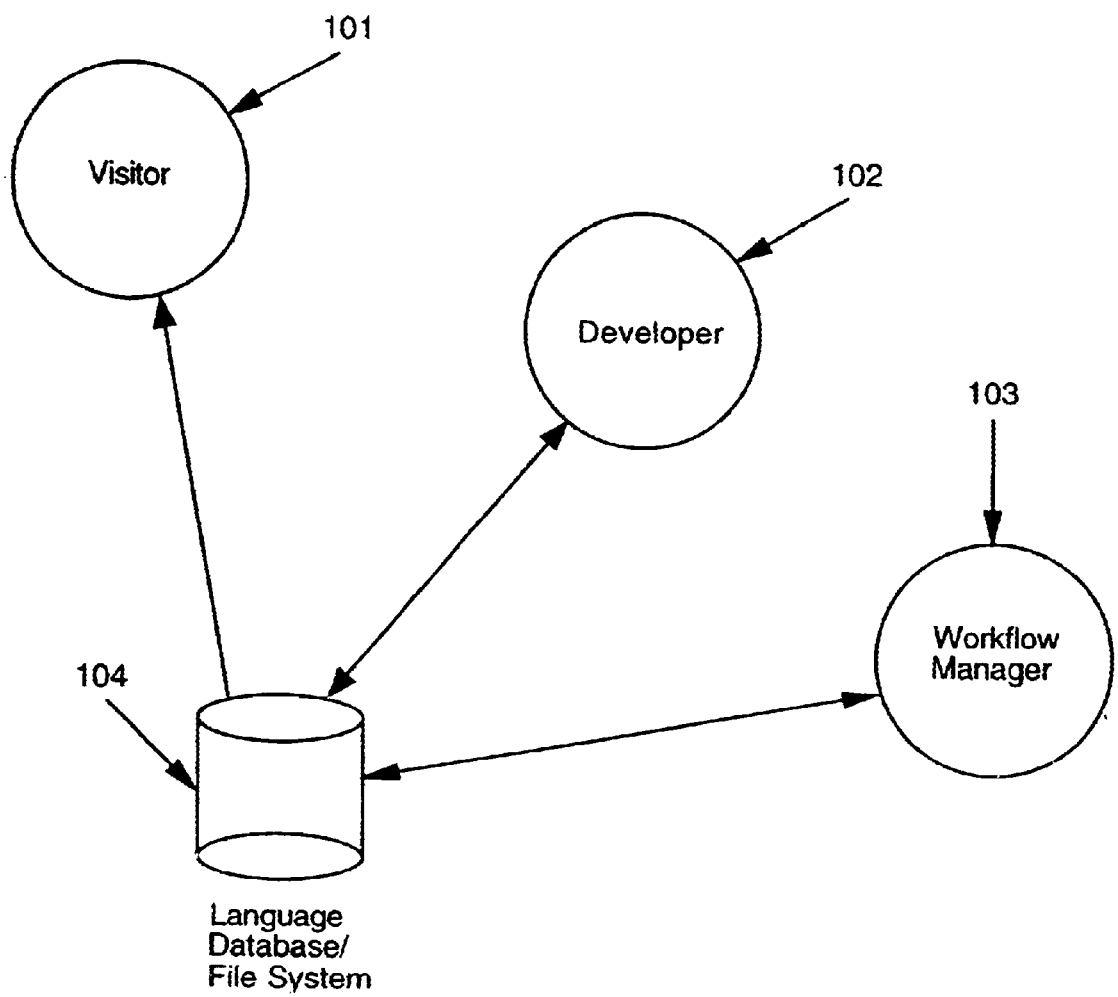
FIG. 1 is a block schematic diagram of the major components of a preferred embodiment of the invention according to the invention.

Referring to FIG. 1, the invention provides three components. The Visitor module 101, the Developer module, and the Workflow Manager module 103. Each module accesses one or more language and country databases and file systems 104. The Visitor 101, Developer 102, and Workflow Manager 103 modules can operate in the same environment or in a standalone mode.

The Visitor module greatly enhances the multilingual Web site visitor's experience by providing an automated and seamless way to serve content in the correct language. Web site publishers can serve all their multilingual content through a single point of entry using the Visitor module. Web site visitors will immediately understand the information they see when they enter a site because it will be instantly presented in their language and for their country.

Figure 2:
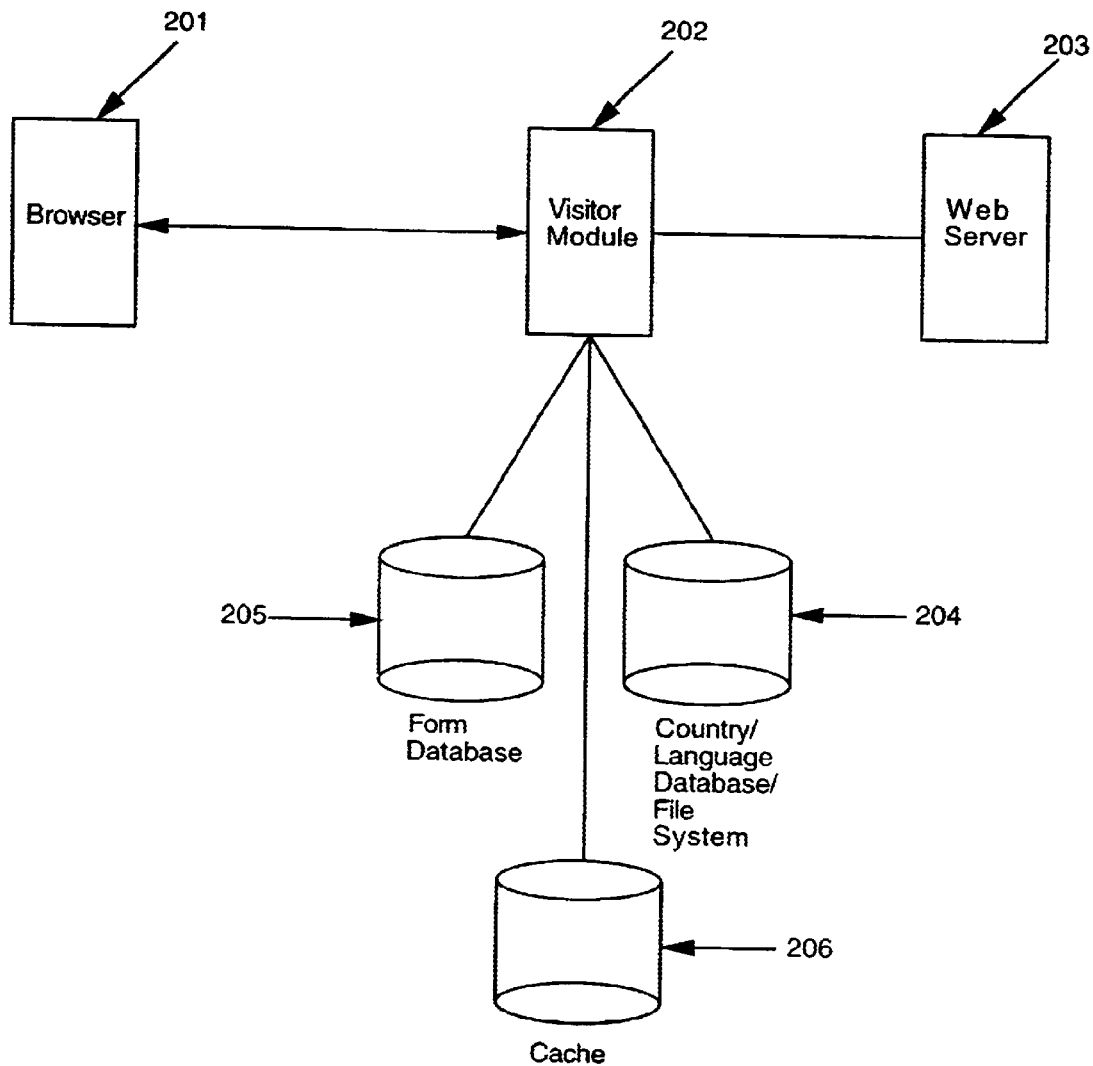
FIG. 2 is a block schematic diagram of the placement of the Visitor module in a network environment according to the invention.

With respect to FIG. 2, the Visitor module 202 works in tandem with a customer's existing Web server 203. It automatically determines the language and country of a Web site visitor and directs the Web server 203 to deliver the appropriate localized content contained in one or more country/language databases and/or file-based content in a file system 204 to the visitor's browser 201. Recently accessed localized content is placed into a Cache 206. The content is placed in the Cache 206 so that if a similar request comes in for a document in that language and for that country, then the cached version will be pushed out to the browser 201. This saves time and processor overhead for accessing the database and file system 204 to rebuild the requested content. In addition, Visitor 202 informs the browser 201 of the proper font and content encoding needed to display the selected language and enables the browser 201 to download the font using, for example, Bitstream's TrueDoc technology, if required.

The Visitor module intercepts input text that is submitted using an HTML form (e.g., a customer feedback form), and writes it into a form database 205, in a manner so that it is easily translated later via the Workflow Manager. Most Web sites have forms that allow site visitors to submit comments or request more information from the site host. This feedback might not be in English and would otherwise be incomprehensible to the recipient in a multilingual environment.

The form database 205 includes sufficient information to identify the country, language and encoding of the text to properly interpret it for subsequent translation. Furthermore, the invention includes a novel database viewer which allows the translated content to be viewed in the context of the form in which it was originally entered.

Figure 3:
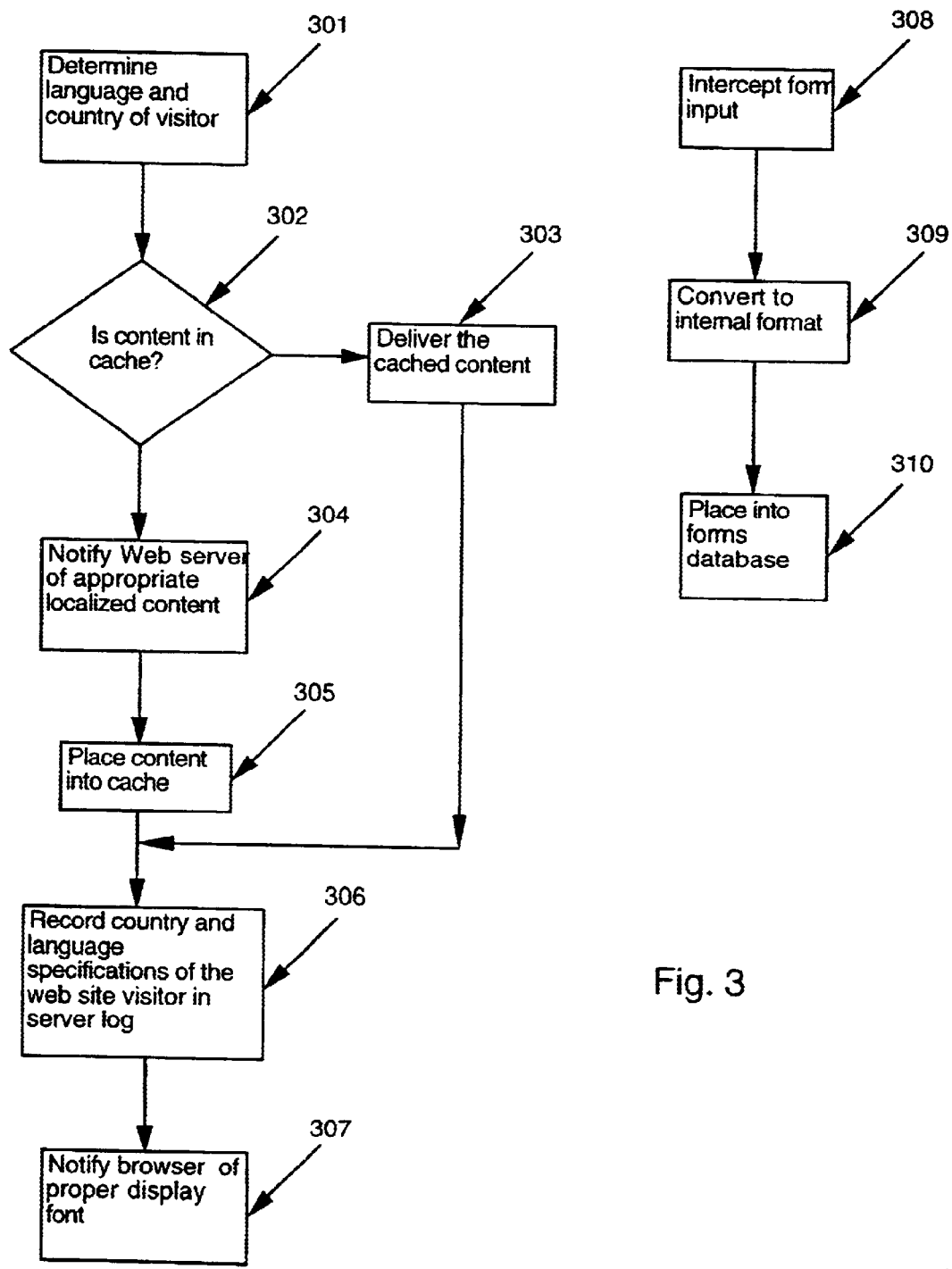
FIG. 3 is a block schematic diagram of a decision flow diagram of the Visitor module according to the invention.

Referring to FIG. 3, the Visitor module determines the Web site visitor's language and country 301 from one or more of the following criteria:

Language preference setting in the browser

Cookie from previous visit to the Web site

Root domain of the visitor

Manual selection by visitor

Language content available on the server

Local database of countries and languages of the world

Local configuration files on the Web site

The Visitor module supports content in all languages and encodings, including Unicode. Manual language selection is easily implemented through the use of a special command set described later in this document thus eliminating the need for complex CGI scripts or interlinked pages. The required content for the Web site visitor's language and country is checked to see if has been previously requested and resident in the cache 302. If the content is in the cache, then it is delivered from the cache 303.

If the required content is not in the cache, then the Web server is notified of the appropriate localized content required 304. The appropriate content is then placed into the cache for future reference 305. The Web site visitor's country and language preferences are recorded in the server log 306. The enhanced Web server log gives the site manager a detailed breakdown of country and language for visitors to the Web site. Finally, the browser is notified of the proper display font and allowed to download the font 307.

Input text that is submitted using an HTML form is intercepted 308. The text is converted to an internal format 309 and is placed in the forms database 310 for later translation.

The Developer module enables the Web site developer to build a single 'master' site which is subsequently displayed in any number of languages, compared with conventional methods whereby the site is re-engineered for each language.

Figure 4:
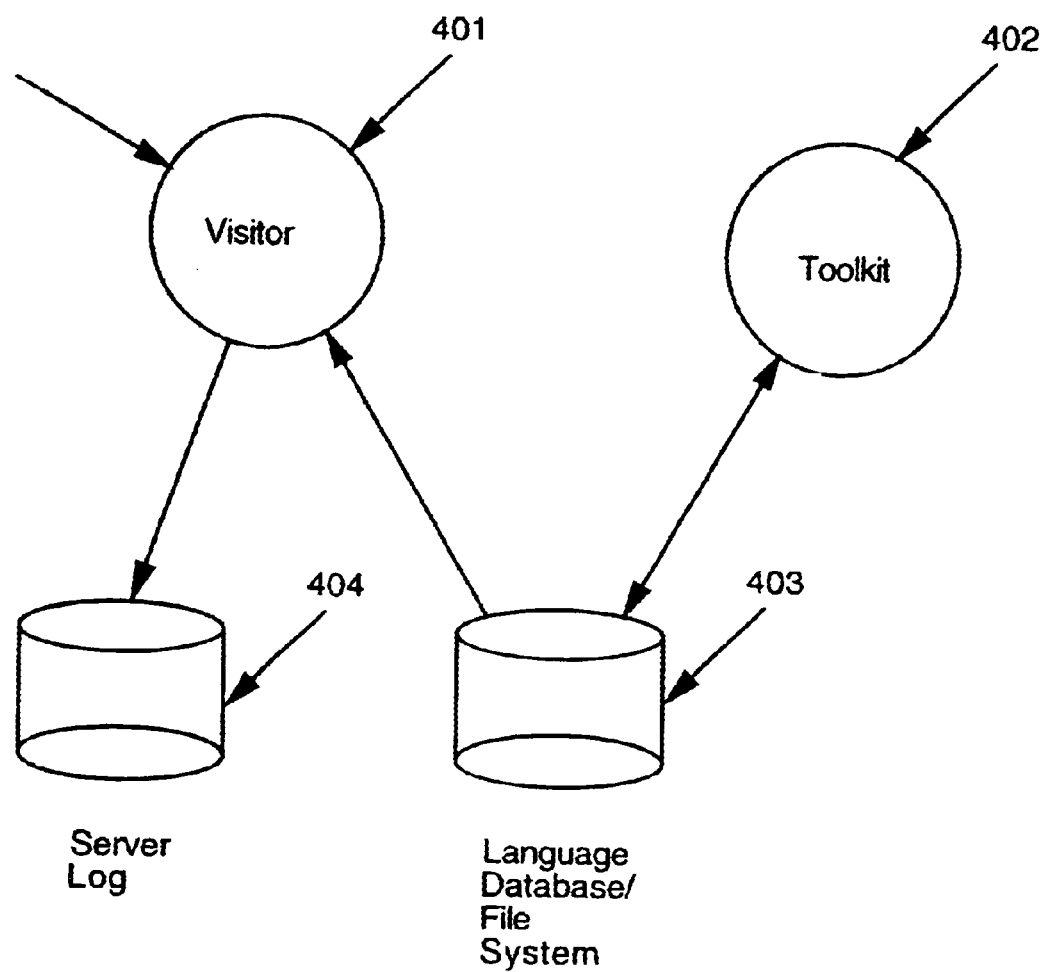
FIG. 4 is a block schematic diagram of the major components of the Developer module according to the invention.

Referring to FIG. 4, the Developer module contains all of the features of the Visitor module 401 which records the Web site visitor's country and language preferences in the server log 404.

A toolkit 402 is provided which allows a master site to be built that is language and country-independent. The actual language content is placed in a language and country database and/or file system 403 where it is easily managed and maintained. When a visitor enters the site, the requested document is automatically served in the visitor's language and for the visitor's country by filling in a document template from the master site with the correct language and country content from one or more databases.

This structure makes the site more compact, reduces site resource requirements and lowers the cost of operating the site.

The cost of making a design change is also reduced as only the master site needs to be updated. This is in contrast to the more time-consuming and expensive approach of propagating a single change throughout all language versions of the site which is unnecessary with the invention.

Keeping the translated content in a database 403 also makes it extremely easy and cost-effective to add additional languages to the site. Adding a language simply involves translating the appropriate content and creating new entries in the database 403. The Developer module makes it unnecessary to replicate the entire site for each new language and country as would typically be the case.

The toolkit 402 offers the multilingual Web designer a great deal of flexibility. It allows a site to be built which combines content common to all languages with content that is specific to a particular language and country. For example, company-wide information which needs to be served in all languages is easily combined with regional-specific information that may only be required in a single language.

The invention provides special tags that are used to insert language or country-specific content into an HTML document. The tags are: Multi-country server-side includes (MCSSI); and Multi-language server-side includes (MLSSI). MCSSI allows locale-specific elements of an HTML document to be dynamically included as a function of the current region or country, while MLSSI allows localized elements of an HTML document to be included as a function of the current language.

The Developer module also supports the incremental construction of a multilingual Web site through a feature that makes it unnecessary to fully populate the site's language matrix completely with documents. If a requested document does not exist (i.e., it has not been translated into the requested language), the invention automatically retrieves the document in the next most appropriate language for the visitor, or the default language of the document, as specified by the Web site manager. Documents can exist on separate servers and/or databases.

The invention walks down a priority list of languages for a designated country. If a document in the language that is first on the priority list is not present on the server, it then looks for the next most appropriate language. The list is sorted according to the most prevalent language or dialect for a particular country. For example, the languages entries for Egypt are {arabic, french, english, berber}. A visitor from Egypt will be presented with a requested document in Arabic, if it is available. If it is not, the system will look for one in French, and so on.

When a visitor is presented with content in an alternate language, an informational text message can be included telling the visitor that the preferred language was not available. The informational text is supplied in the most recently valid language for the visitor's country and language and is embedded within Javascript code. The Javascript code is embedded within the HTML stream that is sent back to the server. The HTML "body" tag has an optional attribute where Javascript code can be inserted after the tag. The informational text contained within the Javascript code is in english and enclosed within the appropriate system tags described below, enabling it to be replaced with its translation in the most recently valid language of the visitor. The informational text has been pretranslated into all of the languages in the system database for the customer. This allows easy access to the appropriate translation for the informational text based on the most recently valid language for the visitor's country and language.

This allows a multilingual Web site to be built incrementally, such that only a portion of the documents on the site need be translated and documents not available in a requested language will be served in the next most appropriate language for a Web site visitor.

This also gives the customer the option of translating only a subset of the total content on the site. The Developer module controls all aspects of content navigation and delivery for the entire site so that a visitor will always be served in the most appropriate language, based on what language content is actually available on the server. The visitor will never see an error message (i.e. a "404-document not found") because the requested content is not available in the visitor's language.

Regions are mapped and organized according to the Web site's needs. For example, a mutli-user server can have a separate region definition for each user's site. The regions file organizes the regions, countries, and languages that the user is concerned with and is configured by the user. The user sets up a mapping, for example, one user can have information specific to Italy and another user can have information that is just concerned with the European region and is not concerned with Italy. This approach allows a hierarchical region-based lookup scheme. Content is hierarchically stored as country and language independent elements such that a one-to-many and many-to-one mapping exists between country and language. The advantage to this approach is that there is no content duplication; the user has only as many files in the system as he has unique content.

Figure 5:
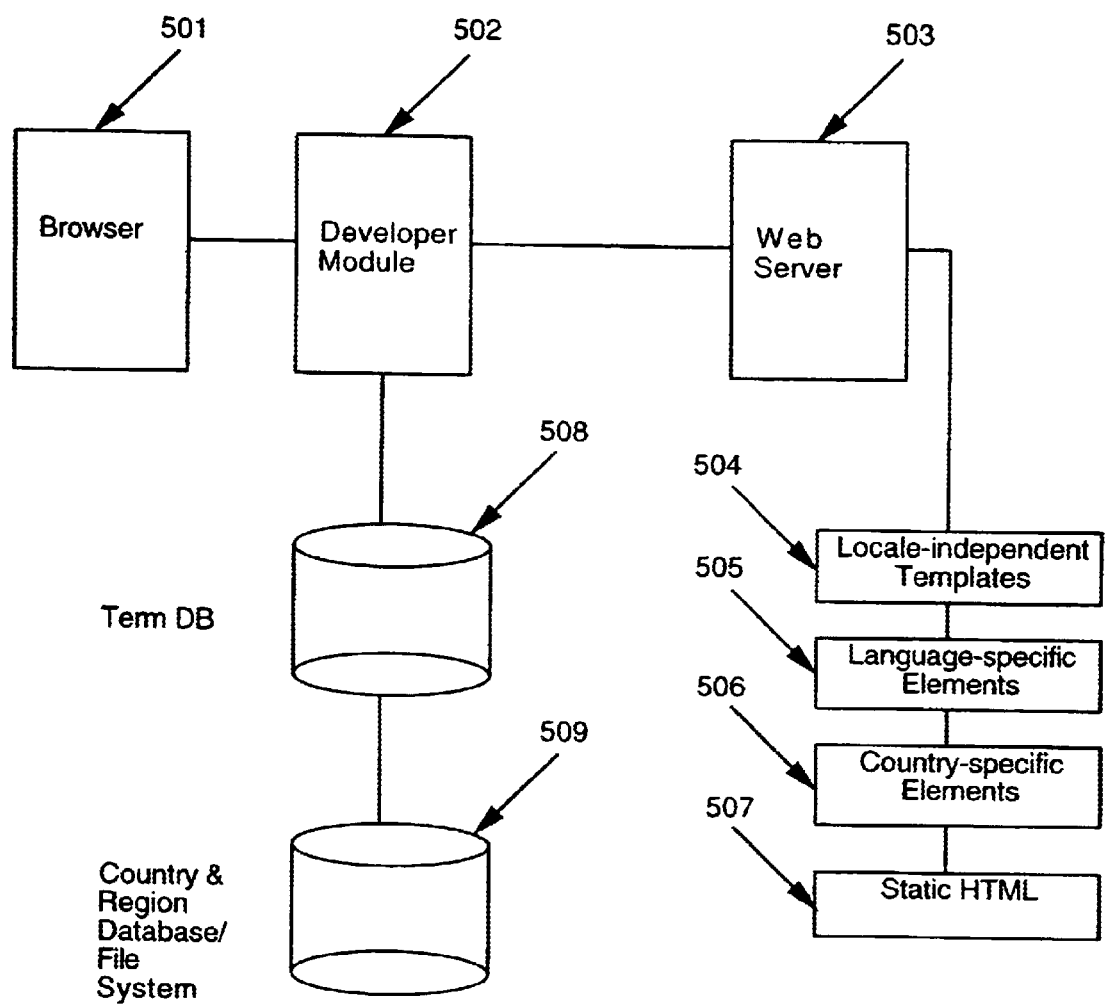
FIG. 5 is a block schematic diagram of the placement of the Developer module in a network environment according to the invention.

With respect to FIGS. 4 and 5, the toolkit 402 also features a novel mechanism to create localized content for specific geographic regions or countries by using a template-based approach to dynamically create documents tailored for a specific language or country. This feature makes it easy to create a true global site localized for each area of the world with the smallest achievable site footprint on the Web server 503.

A template contains placeholders for country and language-specific information that has been removed from a document. This information is dynamically inserted from a TermDB 508 (an external glossary), another template or document located in a database or file system 509, or provided automatically by the Developer module 502 when the composite document is presented to the browser 501.

The basic approach to creating a template has two steps. First, remove as much country and language-specific information as possible from a document. Then, replace this information with appropriate tags and commands specific to the invention and described later in this document.

The advantage to using templates is that a single document can easily support many languages and countries. For example, a single form or CGI-generated document can be constructed so that it will be automatically, localized for different languages and locales. This significantly reduces the number of documents that have to be maintained on the site and makes it very easy to add new languages. It also allows a single update to a document to be immediately propagated to all languages and countries.

This technique allows country or regional content to be conveniently separated from the structure of the document, thereby making it easy to change a design often by updating a single file. This in turn eliminates the ripple effect often seen when a single change must propagate through all of the localized documents on the site. This allows the Web Server 503 to control the locale-independent templates 504, language-specific elements 505, country-specific elements 506, and static HTML content 507.

The invention also allows multilingual content to be served even if an HTML file is not specially tagged (i.e., the file is an ordinary HTML file, not a template). When an ordinary HTML file is served, the HTML is parsed and the translatable text is extracted in the same manner as if it had been specially tagged. The corresponding translations are retrieved from one or more language databases and served.

The parser uses a rules-based approach to identify translatable text in an HTML document. The rules are specified in an external rules definition file.

The default action for the parser is that if there is no explicit rule, then all text between HTML tags is considered translatable.

For example, given the following fragment of an HTML document:

<B> Here is some text </B>

The string "Here is some text" is marked as translatable by the parser. The entire string is then presented to one or more language databases, the translation is obtained in the desired language, and then served to the browser.

The parser first reads the HTML document and parses it into the intermediate format used by the invention. The default rule and the external rules are applied while parsing and text segments are marked as either translatable or non-translatable. Translatable segments are presented to one or more language databases to obtain their translations. Finally, the HTML generator is invoked to serve the localized HTML stream to the browser.

There are cases where text between tags is not necessarily translatable. For example, if the HTML includes embedded script (e.g., javascript or Cold Fusion) only some of the text may need to be translated (e.g., quoted strings). In addition, these scripts are often wrapped in comments so browsers will not display the literal code, but the parser identifies the text.

The rules file consists of a series of declarations and regular expressions that inform the parser what should be considered as translatable. For example, a typical rule that says "all quoted strings within a <script> tag should be translatable" would look like:

begintag:: SCRIPT
rule:: "([^"]*)"
endtag:: SCRIPT

Note: parentheses are used to denote what is translatable within a regular expression.

The rules file is completely modifiable by the user and pre-made rulesets are provided.

The parser sequences the strings for translation. For example, a sequence requiring translation is as follows:

<body>
   This is <b> bold </b> text.
</body>

The strings to be looked up in the database will be (in order):

1. This is
2. bold
3. text.

These word fragments will not necessarily map into the correct translations if they are taken out of context. For example, the translation of "This is" in Japanese could be "Kore ha" or "Kochira ha", or maybe even "Kono" but when pieced together with translations of the other words, it might be incorrect. Even worse, if the word order changes such that "text" should actually come first in the sentence when it is translated, then using this piecemeal approach would end up with something totally incomprehensible.

What is really desired is to look up the entire string: "This is bold text". The translation is then broken up so the proper translations are associated with their corresponding tags. Each component string (e.g., "This is", "bold", etc.) is called a segment. Each segment has a unique segment ID within a document.

The segment ID and the document ID are used together to properly reassemble translated segments into a composite and correct translation, even if the order of words has changed.

In the previous example:

<body>
   This is <b> bold </b> text.
</body>

The assignment of segments are:

1. This is
2. bold
3. text

The translation into Japanese might look like:

1. Kore ha
2. borudo
3. mouji

If the document ID for this document was 8, then the database entries would be:

This is (8,1)→Kore ha
bold (8,2)→borudo
text (8,3)→mouji

This allows the correct translations to be obtained and properly reassembled when the document is served in Japanese.

Visitors to a multilingual Web site may wish to enter information and feedback into a fill-out form in their local language to send back to the Web site manager. A mechanism is provided, and described above, which facilitates the acquisition and translation of this information. The Developer module captures and tags all such information in a sufficient manner so it can be subsequently translated and analyzed by the customer.

This approach allows a site to be built with minimal effort and cost, and allows the site to grow over time to meet the exact needs of the customer.

Figure 6:
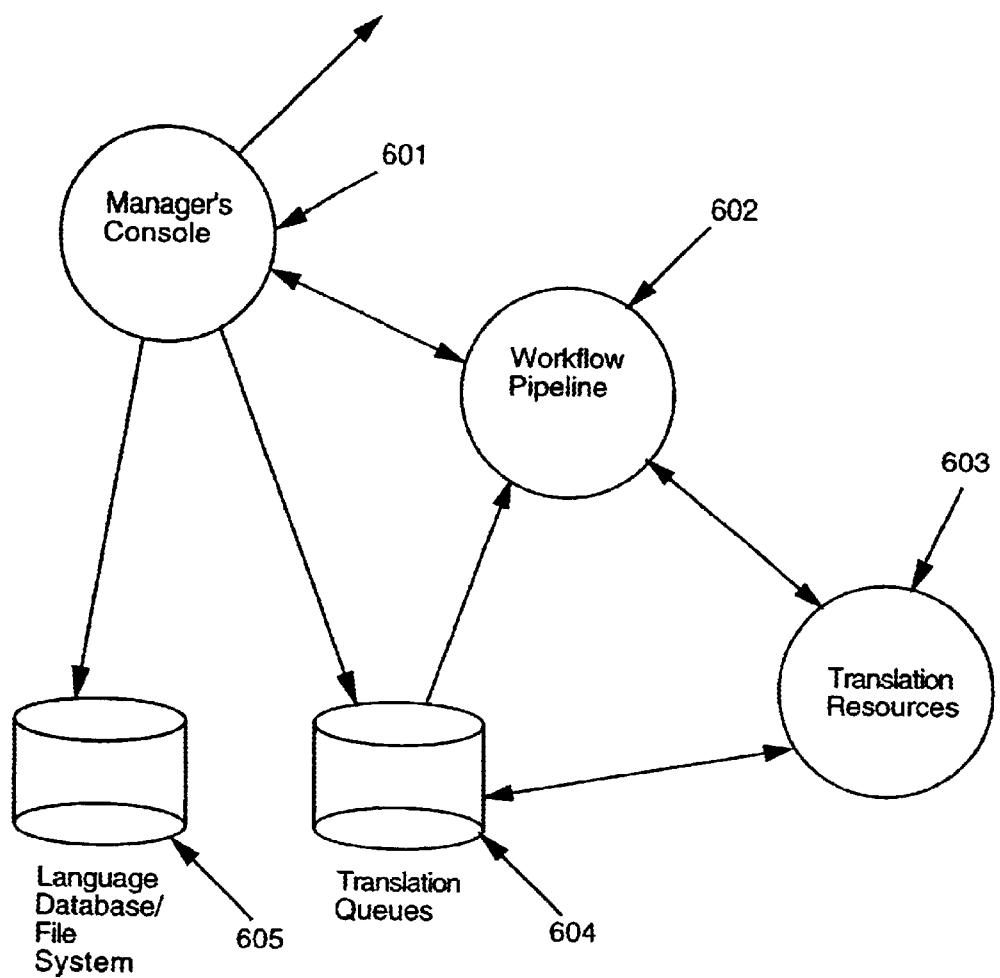
FIG. 6 is a block schematic diagram of the major components of the Workflow Manager module according to the invention.

Referring to FIG. 6, the Workflow Manager module enables the Web site manager to orchestrate the creation of foreign language versions of the site and to automatically keep them synchronized and up-to-date, cost-effectively and with minimal effort. The Workflow Manager module provides a Manager's Console 601, access to a Workflow Pipeline 602, and customizable Translation Resources 603. Translation queues 604 hold the incoming translated documents and outgoing documents to be translated. Documents, data streams, and non-text content are stored in one or more language and country databases and/or file systems 605. Data streams and non-text content are considered documents in the following text.

A brief summary of the duties of the three primary components are:
 the Manager's Console, which serves as the user interface
 the Workflow Pipeline, or transport layer
 a set of Translation Resources that perform the actual translation work The Workflow Manager module is the core component of the invention. The module allows the Web site manager, with no prior linguistic experience, to effortlessly manage the traditionally complex process of translating and updating a multilingual Web site.

The Workflow Manager module provides a natural migration path beyond the Visitor and Developer modules. The Visitor and Developer modules provide a solution to efficiently serve and organize content on a multilingual Web site. The Workflow Manager completes the product family by enabling the language content on the site to be kept up-to-date, efficiently and cost-effectively.

The Web's very nature is dynamic. A monolingual Web site must be updated frequently to remain current. A multilingual Web site has an even more demanding problem of requiring all languages to be updated and synchronized simultaneously. Using traditional techniques, the cost and time required to perform this update and synchronization exceed the benefit and lifetime of the newly updated information to be served, effectively rendering the Web site useless. The Workflow Manager provides a solution to this paradox by reducing the cost and time requirement for language update and synchronization dramatically, thereby ensuring that information on the Web site is always current, regardless of language.

The Manager's Console is the user interface for the Workflow Manager and is the primary point of interaction for the Web site manager.

Figure 7:
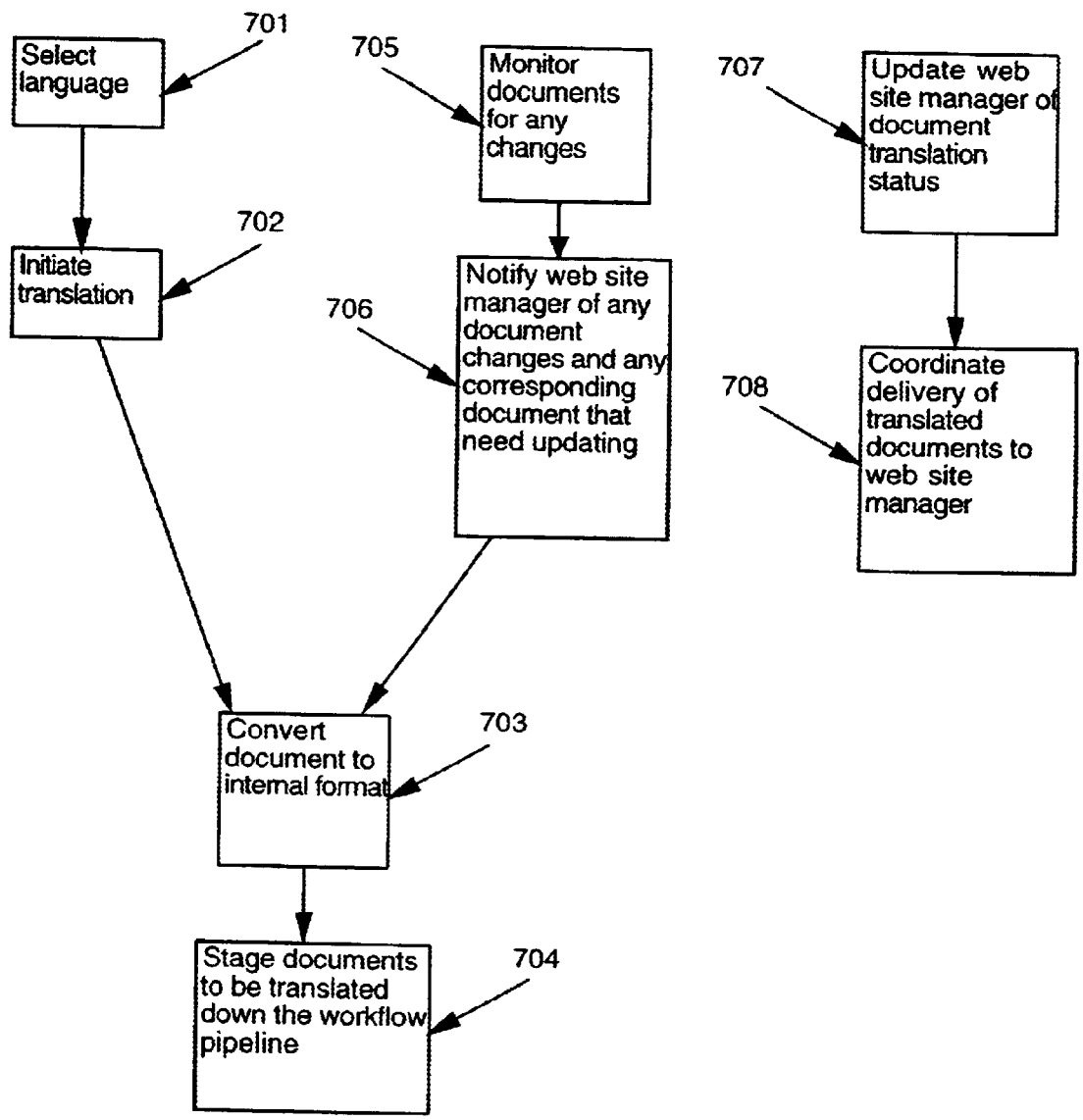
FIG. 7 is a block schematic diagram of a decision flow diagram of the Manager's Console module according to the invention.

Referring to FIG. 7, the Manager's Console detects when a document in the master language has been updated 705. It then notifies the Web site manager which corresponding documents in the other languages require translation 706. The Manager's Console provides "one-touch" translation, whereby at the click of a button, documents from any source requiring translation are converted to the internal format 703, staged down the Workflow Pipeline 704 then dynamically routed and sequenced to the individual Translation Resources where the actual translation is performed. Documents may be Web based and non-Web based and may also contain non-text elements. The documents may contain or refer to additional dependent components such as graphics, audio, video, and other multi-media elements.

When the Web site manager initiates the translation process, the newly updated master language document and its constituent elements, together with associated control information will be converted by the Console to an internal format, one which is more suitable for information transport over the Workflow Pipeline 703.

The Manager's Console automatically controls the sequencing and selection of Translation Resources during workflow processing according to subject matter of the document to be processed, target language of the translation, quality level (whether draft-only or high quality is required) and other variables. The Web site manager can also individually specify the use of a specific set of Translation Resources.

The Manager's Console provides management status and reporting as the translation process ensues 707. It then automatically notifies the Web site manager of the document translation completion and coordinates the delivery of the translated documents back to the Web site for installation and optional review 708. The Web site manager can directly install the translated documents back onto the active area of the Web site at the click of a button, or can make them available for internal review within the organization.

Status information is presented through a highly usable interface that facilitates interaction and improves the productivity of the Web site manager. The Console interface is designed to allow translation and update of the multilingual Web site to be performed cost-effectively and with minimal effort by a non-specialist.

New languages are easily added to the site as well. The Web site manager simply selects the new language from a pulldown list 701, and the Manager's Console automatically initiates the translation of documents into the desired language, under the control of the Web site manager 702. The documents are converted to the internal format used by the invention 703 and staged down the Workflow Pipeline 704.

The Manager's Console also has a built-in access and version control system which allows it to be easily integrated with a third-party authoring or document management system on the Web site.

Figure 8:
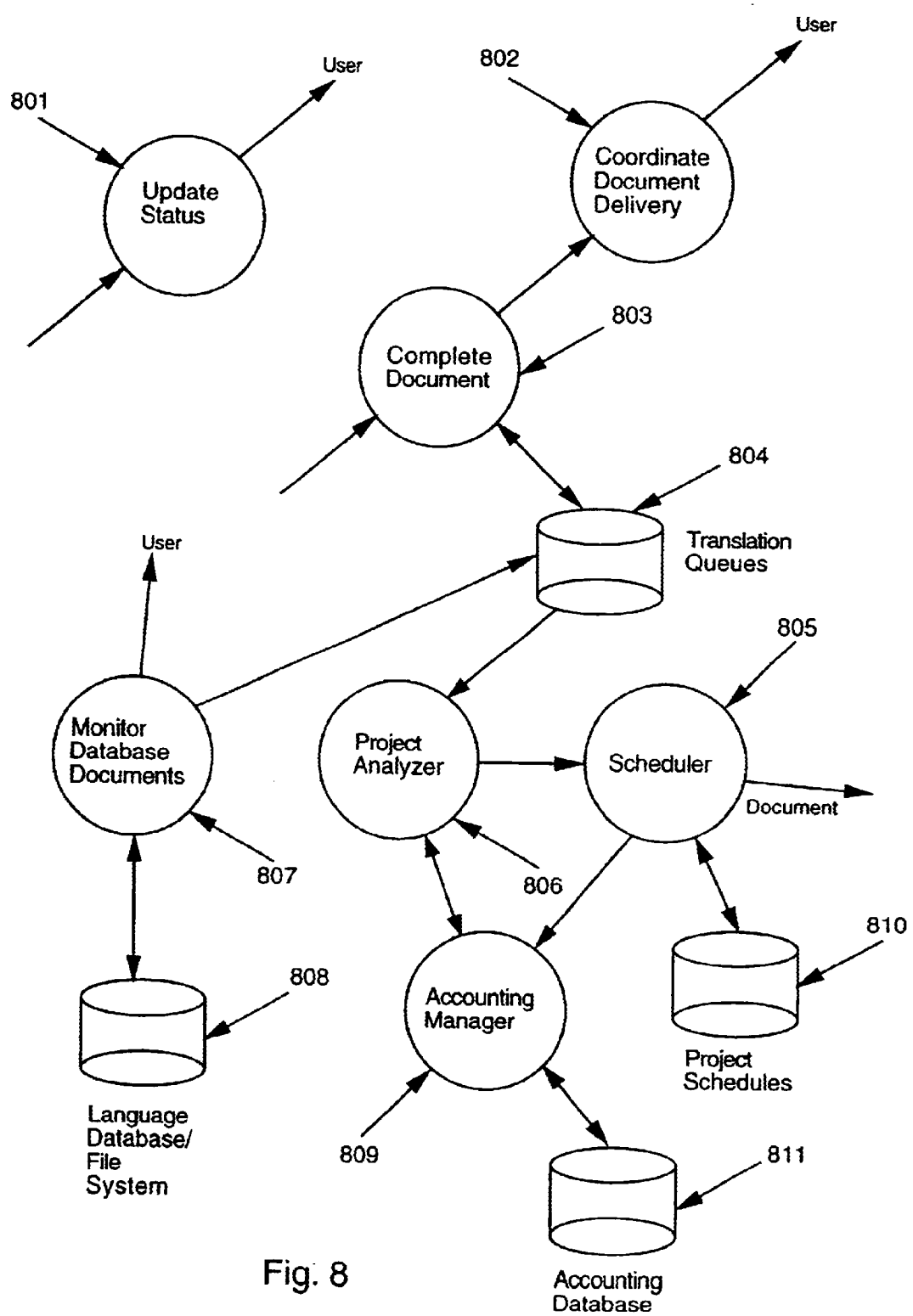
FIG. 8 is a block schematic diagram of the major components of the Manager's Console module according to the invention.

With respect to FIG. 8, a task view of the Manager's Console is shown. The Update Status module 801 updates the Web site manager of the document translation status. The Complete Document module 803 retrieves the translated document and its constituent or dependent components from the Translation queues 804 and updates the associated document status information. The document delivery to the Web site manager is then coordinated by the Coordinate Document Delivery module 802.

Documents that need to be translated are extracted from the language and country databases and file systems 808 and are sent to Translation Queues 804. The Project Analyzer module 806 receives project components, in the form of documents and other electronic content from the Translation Queues 804 and analyzes the project in sufficient detail to determine project cost and resource requirements.

The Project Analyzer module 806 waits until all elements of a project have been received. It then sends the Scheduler module 805 a description of the project and instructs the Scheduler module 805 to begin the project. Typically, the Project Analyzer module 806 works with the Accounting Manager module 809 to generate a project cost estimate prior to beginning the project.

Once the Scheduler module 805 receives the project information from the Project Analyzer module 806, it creates Work Packets, Job Tickets and a Project Schedule. A single project consists of a set of Work Packets and associated Job Tickets. Each Job Ticket contains a reference to a Translation Resource. A set of Job Tickets is associated with a single Work Packet and describes the activities to be performed by that Work Packet. The Scheduler module 805 generates a Schedule that is sent to the Manager's Console for review and validation. The documents and their constituent or dependent components are then scheduled and sent down to the Workflow Pipeline.

The Scheduler module 805 updates the Project Schedule 810 and notifies the Accounting Manager module 809 during the course of the project. This permits the Project Schedule 810 to be adjusted when there are changes in the availability of Translation Resources, or when manual changes are made to the project by an operator via the Manager's Console.

The Accounting Manager module 809 updates customer and Translation Resource accounting in the Accounting Database 811 as jobs complete. The Accounting Manager module 809 generates project cost estimates (based on input from the Project Analyzer module 806), handles customer billing, and is responsible for generating purchase orders for Translation Resources, when needed.

Completed documents and their constituent or dependent components that have been checked by the Web site manager are then installed in one or more language and country databases and/or file systems 808 by the Monitor Database Documents module 807.

The Workflow Pipeline is a transport layer that delivers documents and their constituent or dependent components requiring translation to the Translation Resources where the actual work is performed. The Workflow Pipeline is heavily instrumented so that status and tracking of ongoing work is instantly conveyed to the Web site manager on the Manager's Console.

The Workflow Pipeline uses a highly configurable architecture allowing a variety of Translation Resources to be instantly available to the Web site manager. These Translation Resources include both automated translation tools as well as human translators.

Translation Resources are connected to the Pipeline using an open Application Programming Interface (API) known as an Adaptor. Adaptors allow a variety of Translation Resources to be connected to the Pipeline, making it easy to tailor the Workflow Manager to meet a customer's requirements. The flexible Pipeline architecture can be deployed on intranets as well as the Internet.

Figure 9:
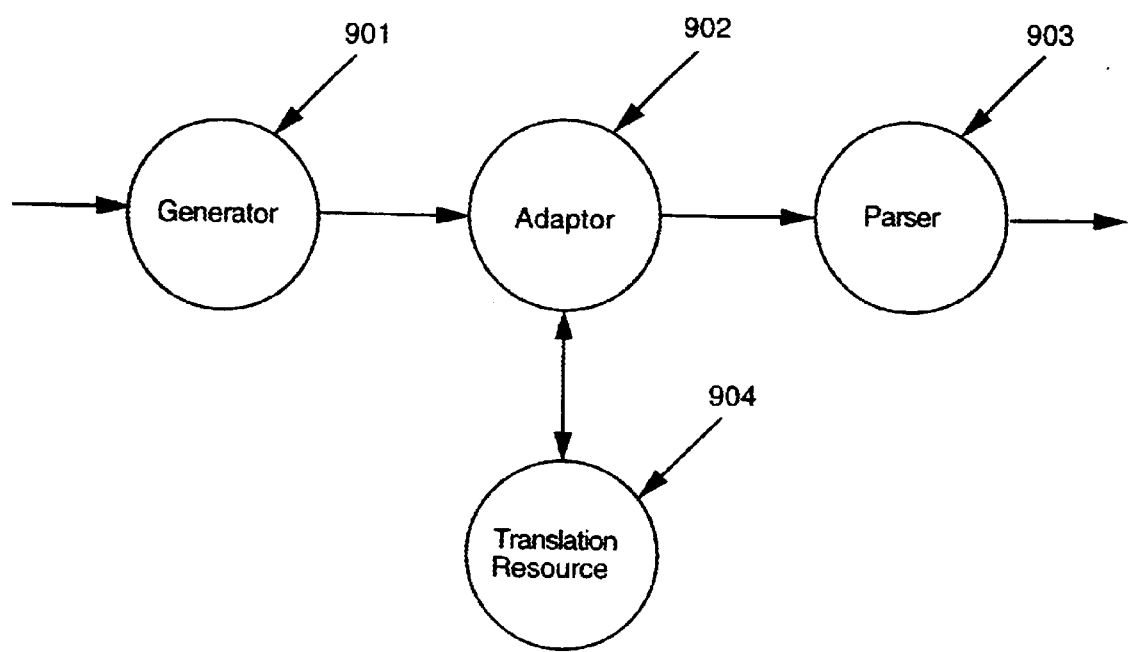
FIG. 9 is a block schematic diagram of the major components of the Adaptor segment of the Workflow Pipeline module according to the invention.

Referring to FIG. 9, Generators 901 are provided that convert the internal format document that is used within the Pipeline to the appropriate format required by the Translation Resource. The Adaptors 902 invoke the specific generator for the appropriate Translation Resource 904. Each Adaptor accepts the internal format document, sends the document to the appropriate Generator 901 which converts the format to one that is acceptable to the Translation Resource 904 attached to the Adaptor 902. The Generator 901 sends the newly formatted document to the Adaptor 902 which in turn sends it to the Translation Resource 904. When the document has been translated by the Translation Resource 904, the Adaptor 902 accepts the document and its associated information, and invokes a Parser 903 which converts the document back into the internal format. The Parser 903 distributes the packet back up the Pipeline.

Parsers are also invoked whenever a document is extracted from the Translation queues and sent down the Pipeline. The Parser converts the document into the internal format. Generators are, in a similar manner, invoked whenever a translated document is posted back onto the Translation queues after completion of translation. The Generator converts the internal format document back to the document's original format (e.g., HTML). The document is then sent to the final destination.

Figure 10:
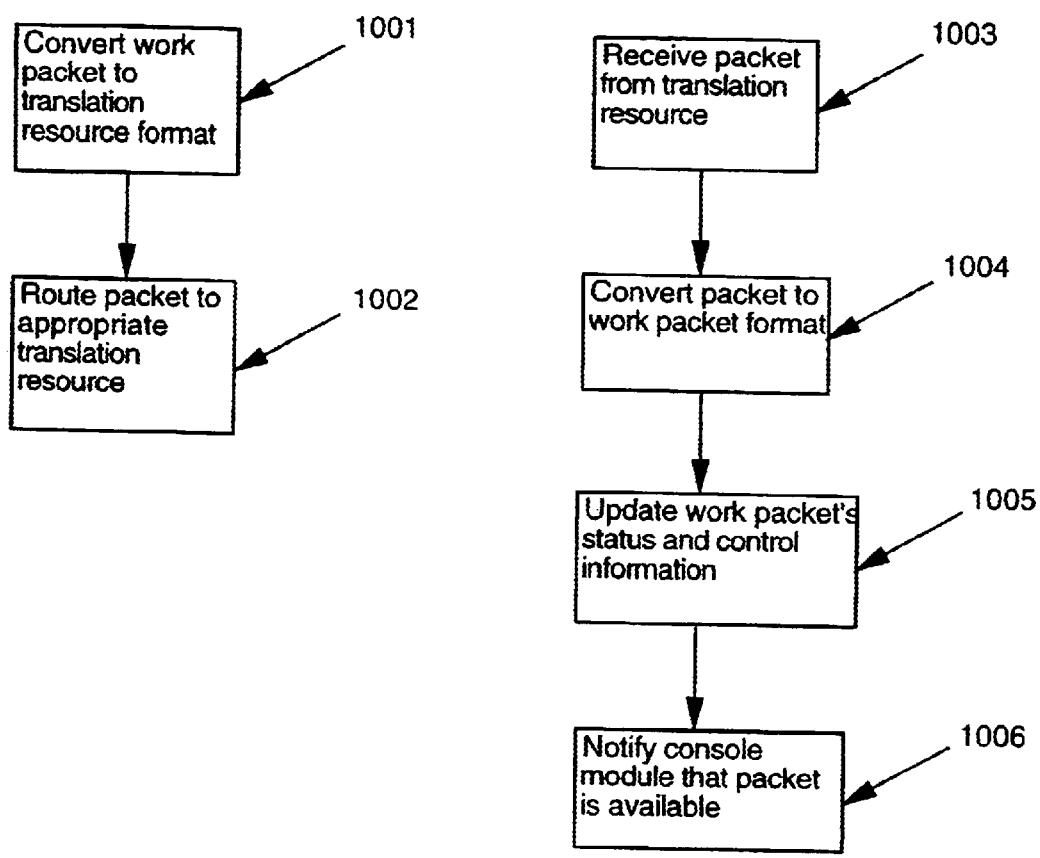
FIG. 10 is a block schematic diagram of a decision flow diagram of the Adaptor module according to the invention.

With respect to FIG. 10, the Adaptor converts work packets to the appropriate Translation Resource format 1001. The packets are then routed to the appropriate Translation Resource 1002.

The Adaptor also receives packets from Translation resources 1003. The packet is converted back to the work packet format 1004 and the status and control information in the work packet is updated 1005. The Manager's Console is then notified of the work packet's availability 1006 in the translation queue.

This degree of flexibility allows new translation technologies and translation service providers to be quickly integrated into the workflow process. Additional resources are easily allocated to accommodate sites which require frequent update and synchronization.

Figure 11:
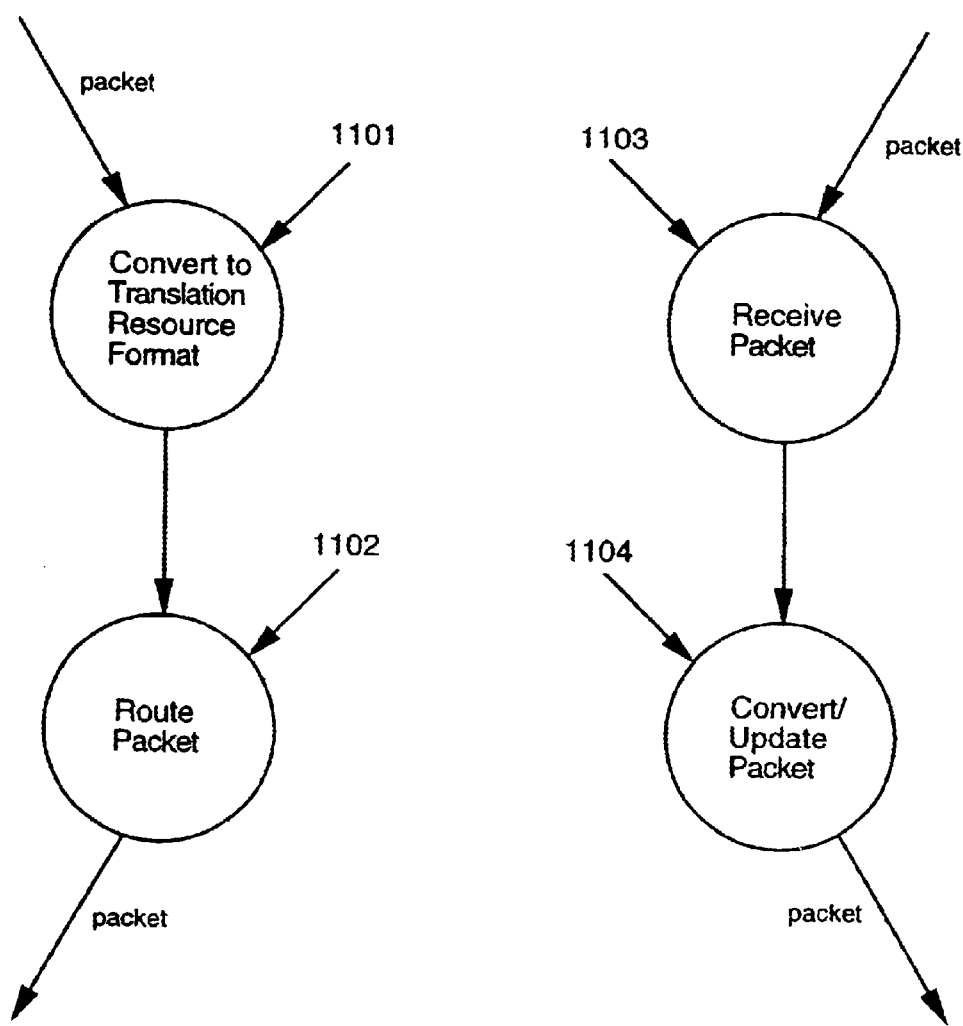
FIG. 11 is a block schematic diagram of the major components of the Adaptor module according to the invention.

Referring to FIG. 11, a task view of the Adaptor is shown. The Convert to Translation Resource module 1101 converts work packets to the appropriate Translation Resource format that is understood by the resource. The packets are then routed to the Translation Resource by the Route Packet module 1102.

Packets are received by the Receive Packet module 1103. The Convert/Update Packet module 1104 performs the packet conversion back to the work packet format and updates the packet's status and control information. It then notifies the Manager's Console that the work packet is available in the translation queue.

The Workflow Pipeline together with the Translation Resources allow the translation process to proceed rapidly and efficiently.

Translation Resources are centralized or distributed functional blocks which are connected to the Workflow Pipeline where the actual work, including translation, is performed. A typical workflow process will use one or more Translation Resources in a specified sequence to complete the required work.

A Translation Resource performs translation or other linguistic functions on a set of input documents and their constituent or dependent components and produces a set of output documents that have been transformed linguistically.

The Workflow Pipeline connects to any type of Translation Resource.

Four examples of Translation Resources are:

Machine translation systems

Translation memory systems

Human translators

Terminology management systems

Machine translation is software which provides fully automatic, draft-quality translations.

Translation memory systems provide a database of source/target translation pairs for a particular document. When an updated version of a document needs to be translated, the translation memory can be used to pre-translate the document with translations from the previous version of the document.

Human translators are linked to the Workflow Pipeline through a special Adaptor that connects to the Internet or a customer's intranet. This allows any translator, anywhere in the world, to join a virtual translation team and provide translation services to multilingual Web sites or any other translation application serviced by the invention.

Terminology management systems provide functions that are necessary to support the entire translation process, such as automated generation and retrieval of client-specific glossaries and lexicons. Both human-based as well as technology-based Translation Resources require access to appropriate glossaries and lexicons to ensure that linguistic transformations are performed in the correct terminological domain.

Technology-based Translation Resources are easily upgraded as their technology improves. For example, older machine translation or translation memory systems are replaced with newer systems simply by unplugging the old systems and plugging in the new ones through the Adaptors on the Workflow Pipeline.

The Manager's Console provides the Web site manager with fully automated management of the entire translation process. The following is a description of how the Web site manager interacts with the Manager's Console in the process of keeping a site up-to-date.

Figure 12:
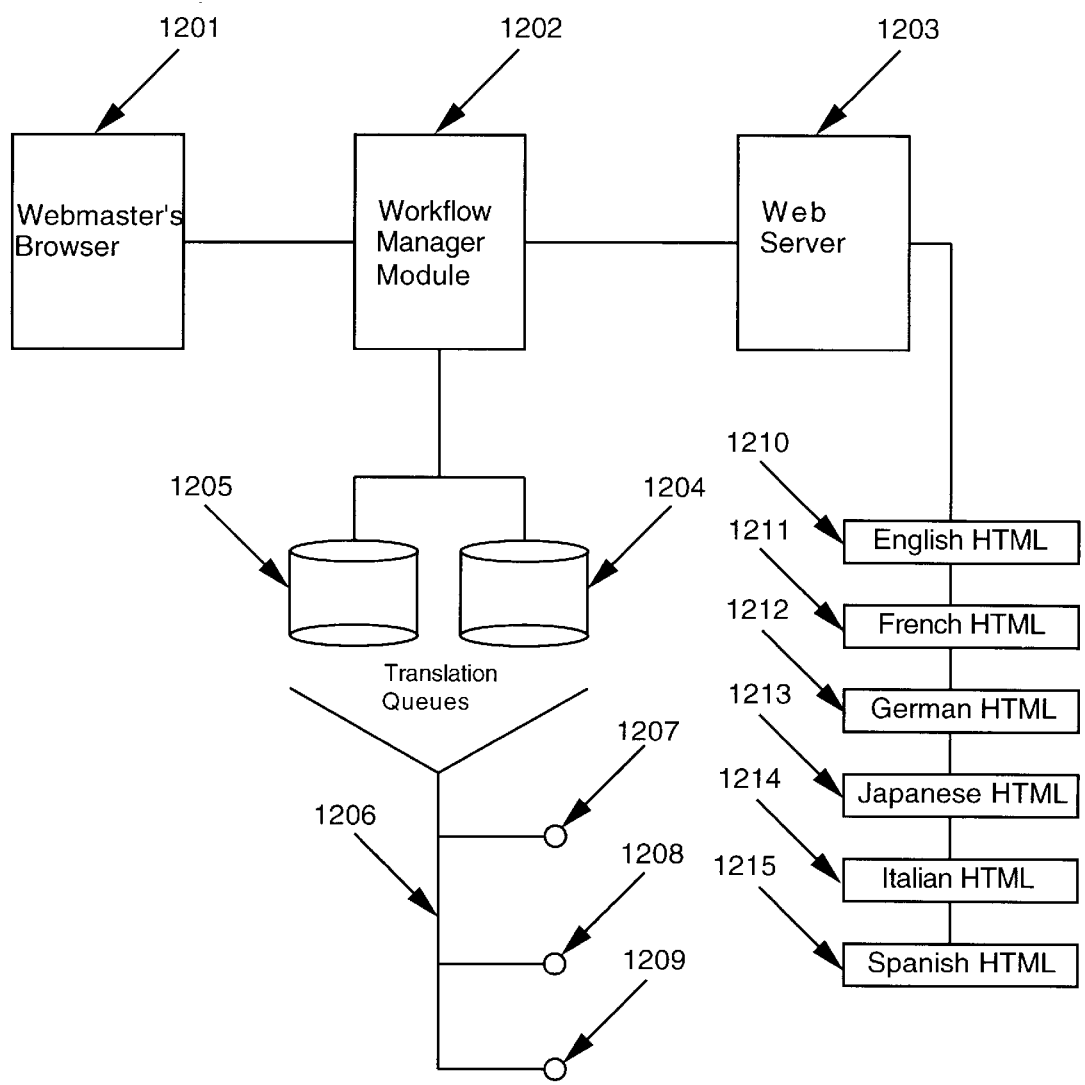
FIG. 12 is a block schematic diagram of the placement of the Workflow Manager module in a network environment according to the invention.

With respect to FIG. 12, when the site is current and all language content is up-to-date, the Manager's Console 1202 reports to the Web site manager 1201 that no action is required.

If a document in the master language is subsequently updated—perhaps out-of-date product information on the Web site is being updated—the Console 1202 will immediately alert the Web site manager 1201 that the corresponding foreign language versions of the document are out-of-date and need to be re-translated.

From this point, the Web site manager simply clicks on a button, using the Console's 1202 "one-touch" translation feature, to automatically initiate the retranslation and update of each document. No additional action is required from the Web site manager 1201 until the documents have been translated and are ready to be mounted back onto the site.

When the Web site manager 1201 initiates the translation process, the newly updated master language document together with associated control information will be converted by the Console 1202 to an internal format, one which is more suitable for information transport over the Workflow Pipeline 1206. The converted document together with relevant control and status information is known as a work packet. The Workflow Pipeline 1206 is responsible for sending and receiving work packets to an appropriate set of Translation Resources 1207, 1208, 1209 where they are processed.

The sequence in which the Translation Resources are engaged by the Pipeline is pre-determined according to:
- Settings previously established by the Web site manager
- Subject matter of the content
- Target language of the translation
- Availability of a particular Resource When a work packet is dispatched to a Translation Resource 1207 for processing, the packet first flows from the translation queues 1205, through the Pipeline Adaptor for that Resource where it is converted from the Workflow's internal format into one that can be processed by that Resource.

Once the Translation Resource 1207 has finished its processing, the packet which contains the work completed by the Translation Resource 1207 flows back through the Adaptor where it is re-converted back into the Pipeline's internal format. The Adaptor is also responsible for analyzing the completion status of the Translation Resource and updating the packet's control and status information accordingly.

A simplified example of a typical workflow sequence is shown below.
1. Machine Translation: automatically translate the untranslated (i.e. new) sections of the document.
2. Translation Memory: pre-translate the document using saved source/target translation pairs from the previous version of the document.
3. Human Translation: post-edit the sections of the document that were machine translated and review the entire document for quality.
4. Terminology Management: obtain the correct lexicons and glossaries required to properly apply the other Translation Resources.

Since the Pipeline 1206 is heavily instrumented, the Console 1202 gives the Web Site manager 1201 continuous updates on the progress of the translation. The Console 1202 also uses status information to automatically provide dynamic dispatch and control decisions to achieve the fastest and most cost-effective turnaround time.

After completion of the workflow sequence, the translated documents are routed back to the Console 1202 where the Web site manager 1201 is notified of their completion. From there, the Web site manager 1201 can directly install the translated documents back onto the active area of the Web site 1203, file system (local or remote), or database (local or remote) at the click of a button, or can make them available for internal review within the organization. For example, when the translated documents are installed onto the active area of the Web site 1203, they are referenced by the appropriate language HTML commands 1210, 1211, 1212, 1213, 1214, 1215 inserted into the Web site pages and the translated content is removed from the translated documents and stored back in the database.

New languages are easily added to the Web site. The Web site manager simply needs to select the new language from a pulldown list along with the desired documents on the Manager's Console and the necessary steps will be automatically invoked to initiate the translation.

The invention provides the Web site manager with an effortless way of keeping the site up-to-date.

One skilled in the art will readily appreciate that, although the invention has been described in the context of Web sites, the same concept applies to other applications. For example, in a fax application, documents are scanned and sent through the invention for translation into selected languages. The translated documents are then automatically faxed to selected locations. Another example would be a universal translator where spoken words are converted into a data stream and sent through the invention for translation into designated languages. The translated data stream is converted back into audible speech and sent to the designated audiences.

The invention is scalable to provide multilingual presentation and management functions across multiple servers in a distributed environment. For example, some sites might have English content on one server, Japanese on another, and so on. Each server will have installed on its respective site, an instance of the invention communicating with other instances of the invention throughout the system. One server is designated the master, and the others are slaves for the purpose of managing content. The servers communicate over a dedicated interface allowing content to be managed in a distributed fashion. This configuration also supports mirrored sites across multiple servers.

One skilled in the art will readily appreciate that, although a single user system is specifically mentioned, the same concept applies to multi-user systems, for example, a multi-user configuration would be appropriate for an Internet Service Provider (ISP) that serves multiple customers, with and without multilingual sites, from a single instance of the invention.

The following is an excerpt of a user manual describing the Visitor and Developer modules for a preferred embodiment of the invention called "WebPlexer":

3. Detailed Functional Description

The following sections are ordered beginning with basic functions and gradually progressing to those that are more advanced. Similar functions have been grouped together logically for easy reading.

3.1 Communication Ports

WebPlexer has 3 network ports. These ports are used to communicate with the client, the Web server, and the console. The ports can be assigned to any available port number on your system and are specified in WebPlexer's WP_Config file.

The 3 ports are:

Internetport. This is the port WebPlexer uses to communicate with the client.

ServerPort. This is the port WebPlexer uses to communicate with the Web server.

ConsolePort. This is the port WebPlexer uses to communicate with a client that is being used for the console. Please see Section 3.10, "WebPlexer Console," for more information on console operation.

Port numbers are assigned starting at 1. Lower numbers are reserved for dedicated processes like ftp(21), http(80), and telnet(23). The lower numbered ports are also privileged in that they require root-level authority to use. For testing, we recommend choosing an available port with a number of at least 3000.

3.1.1 Operating Modes

WebPlexer's InternetPort and ServerPort are configured to support two modes of operation, 'test mode' and 'production mode'.

3.1.1.1 Test Mode

In test mode, a separate access path is created for clients to send requests to WebPlexer. Normal http requests to port 80 and the existing Web server are not affected. This permits off-line testing of WebPlexer functionality until the site has been validated.

To configure test mode:

1. Set InternetPort to an unused port number. This will be used for all incoming WebPlexer requests.
2. Set ServerPort to 80. This will allow WebPlexer to connect to your existing Web server.

To access the Web server via WebPlexer, you would type a URL of the form:

http://www.mysite.com:iiii/ where iiii is the InternetPort assigned above.

Normal requests of the form:

http://www.mysite.com/ will go directly to the Web server, bypassing WebPlexer.

You can make WebPlexer available to ordinary port 80 users, even in test mode, by including a special link on a page to send a request to WebPlexer's port.

For example,

<A HREF="http://www.mysite.com:3080/webplexer/index.html"> WebPlexer test</a> could be included on a site's home page.

3.1.1.2 Production Mode

In production mode, WebPlexer is configured to process all http requests before they reach the Web server. This would normally be done once off-line testing was completed and the site was ready to go into production.

To configure production mode:

1. Set InternetPort to 80. All http requests will be processed by WebPlexer. Note that this will typically mean that WebPlexer must run as a privileged process.
2. Set ServerPort to an unused port. This port will be dedicated to WebPlexer <--> Web server communication.
3. Reconfigure your Web server so it is connected to ServerPort. This is typically done by editing your server's httpd.conf file, but the configuration method is determined by your specific server, so please check the documentation that comes with your Web server.

Normal requests of the form:

http://www.mysite.com/ will then go to WebPlexer for initial processing.

You can still access the Web server directly, with a URL of the form:

http://www.mysite.com:ssss/ where ssss is the ServerPort assigned above.

3.1.2 Setting InternetPort

InternetPort is set by editing the line:

InternetPort iiii in the WP_Config file.

This setting can also be overridden by a command line flag. Please see Section 3.11, "Runtime Options," for more information.

3.1.3 Setting ServerPort

ServerPort is set by editing the line:

ServerPort ssss in the WP_Config file.

This setting can also be overridden by a command line flag. Please see Section 3.11, "Runtime Options," for more information.

3.1.4 Setting ConsolePort

ConsolePort is set by editing the line:

ConsolePort cccc in the WP_Config file.

This setting can also be overridden by a command line flag. Please see Section 3.1 1, "Runtime Options," for more information.

3.2 Logs

WebPlexer supports 3 types of logs:

AccessLog

ErrorLog

InformationLog

The filenames of these logs are defined in the WP_Config file. Additional information on how to define the log files can be found in Chapter 4, "Contents of WebPlexer Files."

NOTE: A fourth log, the Usage Log is generated by the updtusage tool that analyzes the Information Log. This tool will be included in a future release.

The function of each log is described below. A detailed specification can be found in Section 4.4, "Log Specifications."

3.2.1 AccessLog

The AccessLog records information about each request received by WebPlexer, such as date, time, and request type. WebPlexer command requests (WPCommands) are also logged.

NOTE: When WebPlexer is configured for "production mode" (see Section 3.1.1.2, "Production Mode"), WebPlexer's Access Log should be used in place of the Web server's access log for analysis and auditing purposes (the Web server's access log will show all requests originating from WebPlexer).

Examples of AccessLog entries are:

pp93.satcom.net—[28/Jul/1996:23:37:23-0700] "GET/cnv.post/info.html HTTP/1.0" 302—, pp93.satcom.net—[28/Jul/1996:23:37:24-0700] "GET/cnv.post/english-american_United-States/info.html HTTP/1.0" 200 3372 pp93.satcom.net—[28/Jul/1996:23:37:29-0700] "GET/cnv.post/coming/flags/United-States.gif HTTP/1.0" 200 3594

3.2.2 InformationLog

The InformationLog contains detailed information about Webplexer's language selection processing for each request.

Examples of InformationLog entries are:

prune.loria.fr—[26/Jul/1996:05:44:43-0700] Country Selection: prune.loria.fr→France prune.loria.fr—[26/Jul/1996:05:44:43-0700] Language Set: prune.loria.fr→{french-continental, french} prune.loria.fr—[26/Jul/1996:05:44:43-0700] Language Selection: prune.loria.fr→French-continental

3.2.3 ErrorLog

The ErrorLog shows any errors that occurred during WebPlexer operation, or during the processing of a request.

Examples of ErrorLog entries are: [23/Jul/1996:03:35:40-0700] FATAL: Could not send request to HTTP server!!! [23/Jul/1996:04:03:34-0700] Timed out when writing response to client

3.2.4 UsageLog

The UsageLog contains a summary of country and language statistics. It is generated from the InformationLog using the usage log analysis tool. The UsageLog can be further processed using the visits log analysis tool. Please see section x.xx for a description of WebPlexer's log analysis tools.

Examples of UsageLog entries are:

[17/Oct/1996:13:40:11-0700] Language: German www07.btx.dtag.de

[17/Oct/1996:14:09:57-0700] Country: Argentina server1.sminter.com.ar

3.3 Language Selection

WebPlexer's Language Selection feature allows the most appropriate language of a requested document to be served to a Web browser. "Most appropriate language" means a language that has been:

- specified as a preference by the Web browser
- automatically selected by WebPlexer from the country of origin
- manually chosen by the user
- specified by a cookie These three language selection modes all work together seamlessly. They do not require the addition of any special CGI scripts or links to be added to your Web site.

The language selection algorithm requires that each language be assigned a unique directory in the document tree. All documents in that language are placed in the corresponding directory. The entire document tree then becomes a collection of parallel language directories.

For example, if user 'joe' has english, french, and spanish documents on your site, the directory structure might look like this:

```
htdocs/
    joe/
        english/
            index.html
            info.html
        french/
            index.html
            info.html
        spanish/
            index.html
            info.html
```

WebPlexer's language selection algorithm works by inserting the correct language directory in the URL before sending the request on to the Web server.

For example, an incoming URL of:

http://www.lai.com/joe would send a modified URL of:

http://www.lai.comjoe/french to the Web-server, if the browser's preferred language were French.

3.3.1 The Document Matrix

A group of language directories and the documents they contain can be likened to a matrix. This matrix has one row for each language, and one column for each document in the collection. When expressed in this form, the collection is known as a document matrix.

In the example just given, the document matrix might look something like:

|         | index.html | info.html |
|---------|------------|-----------|
| english | X          | X         |
| french  | X          | X         |
| spanish | X          | X         | where the 'X' indicates the presence of a document in that language.

WebPlexer's exclusive document management feature known as "SPAMM" (Sparse Matrix Manager) does not require each document to be translated in every language, and therefore does not require every cell of the document matrix to be filled in.

In addition, SPAMM also permits templates to be placed only in the default language directory (see Section 3.3.2.3, "Specifying the Local Default Languages") and eliminates the need for them to be instantiated in every directory.

SPAMM offers an incremental approach to building a multilingual Web site. Please see Section 3.9.2, "SPAMM (Sparse Matrix Manager)," for more information on this feature.

3.3.2 Setting Up Language Selection

WebPlexer's Language Selection feature is enabled by editing a few lines in the WP_Map file, located in the main WebPlexer directory. Once the file has been set up, any of the language selection modes (browser-specified, automatic, manual) are available.

The information that needs to be entered in the WP_Map file is:

1. The top-level URL of your site.
2. The list of languages on your site and the names of the directories where the documents are located.
3. The encodings in which the documents are represented (e.g. ISO-8859-1)
4. Default directories in case the requested language is not found (usually English).

These four pieces of information together make up what is known as a "URL group" declaration.

Often a single server will serve multiple sites. You can easily have WebPlexer support multiple sites by creating a separate URL group for each site.

The next sections explain each component of the URL group declaration. Please refer to the example WP_Map file supplied with this release while reading the following sections.

3.3.2.1 Specifying the Top-Level URL

The top-level URL is specified by adding lines of the form

URL::<path><path_type> to the WP_Map file.

where

<path> is the directory path of the top-level URL below the htdoc root.

<path_type> is either 'd' or 'f' depending on whether the path is a directory or a file.

NOTE: In the current implementation, when a directory is specified, it is also necessary to specify the corresponding top-level file as well (usually index.html).

In the previous example, there would be two lines reading:

URL::/joe d URL::/joe/index.html f

Note that this file (/joe/index.html) does not actually exist in the document hierarchy but should match the URL the user will type when entering the site.

If the selected language were French, the URL mappings would be:

http://www.lai.com/joe→http://www.lai.com/joe/french and http://www.lai.com/joe/index.html→http://www.lai.com/joe/french/index.html

3.3.2.2 Specifying the Language-to-Directory Map and Charset

The language-to-directory map and charset (document encoding) are specified by adding lines of the form:

<language>: <language_directory><charset> immediately after the URL specification.

where

<language> is the name of the language. Please see Appendix B., "List of Available Languages," for a list of which languages are available for this release.

<language_directory> is the name of the subdirectory containing documents of that language.

<charset> is the encoding used for documents in that language (e.g. ISO-8859-1)

In the previous example, these lines would read:

english: english ISO-8859-1 french: french ISO-8859-1 spanish: spanish ISO-8859-1

3.3.2.3 Specifying the Local Default Languages

The local default languages tell WebPlexer which language to use in case the requested language is not available on the server.

There are two local default languages that need to be specified. The first is called "others" and the second is simply called "default".

The "others" language is chosen when the requested language is valid but does not exist on the server.

For example, if English, French, and Spanish documents exist on the server, but the requested language is Russian, WebPlexer will use the language defined as "others".

The "default" language is chosen when WebPlexer cannot determine the language of a request and none has been specified by the browser. This can happen when the country of origin cannot be determined because the hostname is unavailable, for example, when the requester is behind a firewall.

These directories are specified by including the following lines in the WP_Map file:

others: <others_language><charset> default: <default_language><charset>

It is usually the case that "others" and "default" are both set to English.

In the example above, these lines would read:

others: english ISO-8859-1 default: english ISO-8859-1

The next sections describe the language selection algorithms in more detail.

3.3.3 Browser-Specified Language Selection

In browser-specified language selection, the browser sends its language preference along with the http request. The language is set through a preference or option setting in the browser. The preference is sent to WebPlexer in the "Accept-Language" header within the request message.

The Accept-Language header is described in the http specification. The specification allows the browser to send more than one language in the header. The group of languages is ordered with the most desirable language first.

WebPlexer uses the Accept-Language header to select the correct language. The header is only used when the request is to a URL that matches the top-level URL given in the WP_Map file (see Section 4.2.1, "Specifying the Top-Level URL").

For example, if the top-level URL were /joe, and the browser preference were set to Spanish, a request to:

http://www.lai.com/joe/ would cause the URL to be mapped to:

http://www.lai.com/joe/spanish and sent to the Web server.

If the browser has specified more than one language, WebPlexer goes through the languages in order and stop when it finds the first one that is present on the server. If none of the languages are found, WebPlexer uses the "others" language specified in the WP_Map file (see Section 4.2.2.1, "others:")

Once the language has been determined, WebPlexer redirects the browser to the directory for that language. All accesses to relative links within the requested document stay within that directory.

Changing the browser's language preference does not have any effect until the top-level URL is again requested and the browser re-enters the site. The recommended way to change language within a language directory is by manual selection (see Section 3.3.5, "Manual Language Selection").

Browser-specified language selection has the highest priority upon entry to the site.

3.3.4 Automatic Language Selection

In automatic language selection, WebPlexer determines the language by first determining the country from the requester's domain, then looking up the language for that country in a database.

Automatic language selection is only active under the following two conditions.

1. The request is to the top-level URL specified in the WP_Map file (see Section 3.3.2.1, "Specifying the Top-Level URL").

2. The browser has not set a preferred language (see Section 3.3.3, "Browser-Specified Language Selection").

NOTE: If the browser has specified a language preference, it overrides any automatic language selection.

For example, if the top-level URL were /joe, and the host domain were eiffel.tower.fr, a request to:

http://www.lai.com/joe/ would cause the URL to be mapped to:

http://www.lai.com/joe/french and sent to the Web server.

The country-to-language database contains a list of languages for each country. These languages are arranged in order of frequency from most-used to least-used.

This list of languages is processed in the same way as preferred languages are handled when received from a browser (see Section 3.3.3, "Browser-Specified Language Selection"). This means that the languages are examined until the first one present on the server is found.

For example, the languages of Switzerland are {german, french, italian, romansch} and will be searched in that order. The rules for selecting the local default languages are the same as for browser-specified languages, if the language cannot be found.

3.3.5 Manual Language Selection

Manual language selection is effective at any time. Manual language selection overrides any automatic or browser-specified language.

Manual language selection is performed by issuing a WPCommand whose type is "language". WPCommands are more fully described in Section 3.6.3.3, "WPCommands." They result in the browser sending a request to WebPlexer of the form:

http://www.lai.com/joe/xxxx/WPCommand?language=yyyy where xxxx is the current language (plus country) directory and yyyy is the desired language to switch to.

NOTE: language (plus country) means that the language directory is appended with the currently selected country (e.g. english_United-States)

Note that even with manual language selection, the languages and directories in the WP_Map file still need to be set up as in automatic language selection.

3.3.6 Cookie-based Language Selection
3.3.6.1 Using WPCommand?language

WPCommands are normally issued through hypertext links embedded in an HTML document. This statement illustrates a simple example, <A HREF="WPCommand?language=french">French</A>

If the user is currently looking at an English document, clicking on the word 'French' will cause the browser to send WebPlexer a request for the URL http://www.lai.com/joe/english_United-States/WPCommand?language=french which will map to http://www.lai.com/joe/french_United-States/xxx.html where xxx.html is the current document (the one that contains the WPCommand link). Note that WebPlexer will return the browser to the original document in the new language, in this case, French.

The manual language selection feature is performed completely by WebPlexer, without the need for CGI scripts or complex interlinking of HTML documents. It merely requires the addition of a link in the HTML to send the WPCommand to WebPlexer for each desired language.

The WPCommand hypertext link can be used like any other HTML link, that is, it can be placed within a table, connected to a graphic or icon, or built into an imagemap.

3.3.6.2 Using WPCommand?link

The method described above works well when the number of languages is small. However, as the number of languages on the server increases, there may not be enough space to have the links for all the languages appear on each page.

In this case, a generic mechanism exists for handling WPCommands that will move all of the language selection links off to a separate page. Once the links are moved, a hypertext link that points to this special language selection page is placed on each page of your site.

Because of the need to return to the originating page when the language is changed, WebPlexer requires that a special WPCommand be used to invoke the link to the change language page.

This WPCommand is of type 'link' and takes the name of the page to link to as an argument. Its external behavior is the same as if a direct HTML link were used, except it notifies WebPlexer that a change language (or change country) WPCommand is about to be issued.

This allows WebPlexer to return the browser to the originating page once the language has changed.

In the HTML, this link would be coded as

<A HREF="WPCommand?link=langsel.html">Change Language</A> and would produce a request URL to WebPlexer of the form http://www.lai.com/joe/english_United-States/WPCommand?link=langsel.html where langsel.html is the language selection page.

3.3.7 Hostname and IP Address Overrides

WebPlexer provides a method of optionally forcing the selection of specific language(s) for certain hostnames or ip addresses.

This feature overrides automatic language selection when the top-level URL specified in the WP_Map file is requested. A browser-specified language preference will still be used if specified.

There are two files used to specify automatic language selection overrides: HostNameMap and IPAddrMap, both of which are in WebPlexer's language subdirectory.

The format of these files is described in Section 4.3, "Map Overrides."

3.3.8 Setting the Global Default Language

The global default language is set in the WP_Map file with the directive:

defaultLanguage <language> and is normally the same as the local default language specified in the URL group definition. Specifying the local default language is described in Section 3.3.2.3, "Specifying the Local Default Languages."

The global default language is used as the default for the console and for some WebPlexer initialization.

3.3.9 Content Tagging and Support for Multilingual Browsers

Content tagging allows WebPlexer to inform the browser of the language and charset used to encode a document when the document is accessed. Some browsers, like Netscape Navigator, use this information to automatically switch to the correct font and encoding for a particular language.

Content tagging is always active whenever a document is fetched from a language directory that is specified in the WP_Map file.

When a document is content tagged, the http Content-Language and Content-Type response headers are returned with the document to indicate the language and charset in use.

These fields are automatically updated by WebPlexer even when the language is changed by manual selection.

3.4 Country Selection

WebPlexer provides three ways by which the country of an incoming request is determined.

Automatic country selection

Manual country selection

Cookie-based country selection

These are described in detail below.

3.4.1 Automatic Country Selection

With automatic country selection, WebPlexer determines the country from the requester's domain. If the domain cannot be determined (usually because the requester is behind a firewall), the country is set to the global default country (see Section 3.4.5, "Setting the Global Default Country").

Automatic country selection is only active when the browser request is to the top-level URL specified in the WP_Map file. See Section 3.3.2.1, "Specifying the Top-Level URL," for a detailed description of how to set the top-level URL. Once the country has been determined, its value is saved by appending it to the language directory in the mapped URL.

For example, if the top-level URL were /joe, and the host domain was eiffel.tower.fr, a request to:

http://www.lai.com/joe/ would cause the URL to be mapped to:

http://www.lai.com/joe/french_France/

By embedding the country name in the URL, WebPlexer can retain the country setting for the lifetime of this session.

3.4.2 Manual Country Selection

Manual country selection is performed by issuing a WPCommand of type "country". WPCommands are more fully described in Section 3.6.3.3, "WPCommands." They result in the browser sending a request to WebPlexer of the form:

http:H/www.lai.com/joe/xxxx/WPCommand?country=yyyy where xxxx is the current language directory appended to the current country, and yyyy is the desired country to switch to. Once the country changes, the language will also change to match the new country.

For example, if the current country is France and the current language is French, and the current document being viewed is info.html, to request that the country be changed to German, this request should be sent to WebPlexer:

http://www.lai.com/joe/french_France/WPCommand?country=germany

WebPlexer will respond with a new URL that looks like http://www.lai.com/joe/german_Germany/info.html and which will fetch the German version of the info.html document.

3.4.3 Cookie-based Country Selection
3.4.4 Declaring Worldwide Regions

Regions are defined in the WP_Regions file. Regions allow groups of countries to be combined into geographical areas that are meaningful for the type of content that is on the site.

For example, if a company had one sales office in Europe, and another in Asia, and had developed Web site content that was specific to these markets, it might want to create two regions like this:

Sales_region1: France, Germany, Italy, Spain

Sales_region2: China, Hong-Kong, Japan

Regions can be either user-defined or pre-defined (default). User-defined regions are specified in the WP_Regions file (see Section 4.9, "WP_Regions").

Pre-defined (default) regions are established by WebPlexer. Please see Appendix D., "List of WebPlexer Default Regions," for more information.

Regions are used by the multi-country server-side include feature (see "Multi-Country Server-Side Includes (MCSSI)"). They allow specific content to be presented to users from countries in those regions when they enter the Web site.

3.4.5 Setting the Global Default Country

The global default country is set in the WP_Map file with the directive:

defaultCountry <country> where <country> is one of the valid countries given in Appendix C., "List of Available Countries."

The global default country is used as the default for the console and for some additional WebPlexer functions.

3.5 Country and Language Management

WebPlexer has the unique ability to independently maintain both the country and the language associated with each request. This provides a great deal of flexibility in selectively targeting content to specific regions or countries of the world and, at the same time, making that content available in multiple languages.

It is important to understand how WebPlexer's country management and language management are different and how they are similar.

In the following description, the term "session" refers to a logical grouping of requests between browser and WebPlexer. A session begins with the browser making a request for the top-level URL. It ends with the final response being sent from WebPlexer to the browser. A session can have any number of request/response pairs between these two endpoints.

A session has a state associated with it. Included in this state are the country and language of the requester.

Once the country and language state have been determined from the initial request, they remain unchanged until the browser initiates an action like manually changing the country or language.

Unfortunately, the http protocol used for data transport on the Web is a stateless protocol. This means that the protocol does not allow state to be maintained from one request to another.

WebPlexer uses a unique persistence mechanism for retaining session state across multiple requests. This mechanism allows country and language information to be saved throughout the lifetime of a session.

WebPlexer uses a simple 4-step algorithm for managing country and language when processing a request:

1. Determine country.
2. Determine language from country.
3. Select content for country.
4. Modify content for language.

Once the country and language for a request have been established, they are available as state variables within the HTML and can be used for:

1. Content selection based on country, region, or language.
2. Word and phrase replacement out of an external glossary (this glossary is referred to as a TermDB).
3. Setting language and country-specific "custom variables" such as country flag, language name, and country name.
4. Sorting a list of items according to sort rules of the currently displayed language.

WebPlexer's 4-step algorithm for country and language management is described in more detail below.

3.5.1 Determine Country

WebPlexer will first determine the country of the requester if it is not known (on an initial request), or when it is manually selected (through a WebPlexer change country command (see Section 3.4.2, "Manual Country Selection")).

3.5.2 Determine Language from Country

WebPlexer uses the country from the previous step to determine the slanguage of the requester. A list of languages for the selected country is obtained from a database and the first one that matches a language present on the server is selected.

For example, if the requestor's country were Switzerland, the requestor's language could be set to either german, french, italian, or romansch depending on which one was found first on the server.

The exceptions to this rule are:
1. When the browser specifies the language explicitly in its preferences (see Section 3.3.3, "Browser-Specified Language Selection").
2. When the language is overridden through a HostName or IPAddress map (see Section 3.3.7, "Hostname and IP Address Overrides").
3. When the language is manually selected through a WebPlexer change language command (see Section 3.3.5, "Manual Language Selection").

Once country and language are determined, the following rules apply.

3.5.3 Select Content for Country

WebPlexer uses the country to dynamically select content specific to that country. This allows the content to change based on the geographic location of the requester. The actual selection mechanism is controlled by the multi-country server-side include feature. This feature is more fully described in "Multi-Country Server-Side Includes (MCSSI)." Additional information can be found in Section 3.6.1, "Template Model," which describes WebPlexer's template model.

3.5.4 Modify Content for Language

WebPlexer presents the content in the language selected by the requester.

There are 3 methods that WebPlexer uses to present content in the selected language:
1. A static document that has been pre-translated is selected from the corresponding language directory. For example, if the language is French, the document will be retrieved from the french directory.
2. Content that has been pre-translated is inserted into a template using the multi-language server-side include feature. This feature is more fully described in "Multi-Language Server-Side Includes (MLSSI)." Additional information can be found in Section 3.6.1, "Template Model," which describes WebPlexer's template model.
3. Words and sentences that are marked up with WebPlexer's WPReplace tags are dynamically "translated" into the requested language using an external TermDB. WPReplace tags and TermDBs are described in Section 3.6.3.1, "WPReplace," and Section 3.6.2, "TermDBs (tm)."

3.6 Multilingual ToolKit (tm)

The Multilingual ToolKit is a set of HTML extensions and templates that simplifies the design and construction of multi-language and multi-country Web pages.

The Multilingual ToolKit consists of several key WebPlexer resources:
1. A template-based model of page construction.
2. External, multilingual glossaries known as TermDBs.
3. A set of HTML extensions to allow country and language settings to dynamically control a document's content.
4. Built-in support for manually changing language and country, eliminating the need for special CGI scripts or complex interlinked pages.
5. Custom variables to facilitate customization of a document according to the current language and country.
6. Custom functions to change the appearance of a page according to language and country.
7. Server-side includes to allow a document to be built out of language and country-specific component parts.

The following sections discuss the specific components of the Multilingual ToolKit in more detail.

3.6.1 Template Model

WebPlexer's Multilingual ToolKit uses a template-based approach to dynamically create documents tailored for a specific language or country.

A template contains placeholders for country and language-specific information that has been removed from a document. This information is dynamically inserted from a TermDB, another template or document, or provided automatically by WebPlexer when the composite document is presented to the browser.

The basic approach to creating a template has two steps. First, remove as much country and language-specific information as possible from a document. Then, replace this information with appropriate WebPlexer tags and commands.

The advantage to using templates is that a single document can easily support many languages and countries.

For example, a single form or CGI-generated document can be constructed so that it will be automatically localized for different languages and locales.

This significantly reduces the number of documents that have to be maintained on the site and makes it very easy to add new languages. It also allows a single update to a document to be immediately propagated to all languages and countries.

This technique also allows country or regional content to be conveniently separated from the structure of the document, making it easy to change a design often by updating a single file. This eliminates the ripple effect often seen when a single change must propagate through all of the localized documents on the site.

3.6.1.1 Template Types

WebPlexer supports three basic kinds of templates.
1. Static (no template).
2. File-based.
3. Tag-based.

One document may contain all three template types. We call such a document a "composite" document, since it is made up of multiple elements.

Most documents will have a mixture of these three basic types. In the sample included with this release, the file 'info.html' is a combination of static and tag-based templates, whereas the template of 'contact.html' is completely tag-based.

Please look through the sample files in the htdocs directory of this release for examples showing the use of templates.

File-based templates require the server-side include feature. This feature is not available in the current release.

Tag-based templates are the most generic and allow a single document to be used across all languages and countries.

In general, the smaller the amount of static content in a template, the more generic the template is and the fewer the number of times it needs to be instantiated.

The next sections discuss the template types in more detail.

Static

Static templates are not really templates at all. They are simply collections of static text.

File-based

File-based templates allow external files containing localized content such as country, regional, or language-specific information to be inserted dynamically into a document. File-based templates are provided using the server-side include feature described in Section 3.6.3.5, "Server-Side Includes."

Tag-based

Tag-based templates allow replacement of marked-up text with translations from an external TermDB according to the selected country or language. Tag-based templates are provided using the WebPlexer HTML extensions described in Section 3.6.3.1, "WPReplace."

3.6.2 TermDBs (tm)

A TermDB is an HTML representation of a multilingual glossary. The glossary is built in the form of an HTML table. Rows in the table correspond to entries in the glossary, be they words, phrases, or arbitrary strings. Columns in the table correspond to individual languages in the glossary such as English, French, or German.

One language in the TermDB is designated the primary language and is assigned to column 1 of the table. This primary language is used as the language of the key when looking up entries in the TermDB.

The TermDB is used together with the WPReplaceBegin and WPReplaceEnd tags. (See Section 3.6.3.1, "WPReplace"). The tags enclose text that will be replaced by a TermDB entry. The text must be in the primary language.

The following example shows how the word "hello" would be translated using the TermDB.

Sample HTML:

<!—WPReplaceBegin→hello<!—WPReplaceEnd→

Sample TermDB:

| english | hello |
| french | bonjour |
| spanish | hola |

When WebPlexer accesses the TermDB, it first finds the word 'hello' by looking in row 1 (the primary language row) of the TermDB and finding the column that contains the desired term. Then it retrieves the term from the row of the table corresponding to the current language (row 2, in the case of French) in the column it identified as containing the desired term.

This release of WebPlexer comes with a standard TermDB that includes the names of all languages and countries translated into 25 languages.

WebPlexer supports the use of multiple TermDBs. Each top-level URL declared in the WP_Map file can be associated with a different TermDB, and multiple TermDBs can be defined for a given URL. This makes it possible to maintain several small Term DBs rather than one large one.

There are three types of TermDBs:

The System TermDB (included with the product)

Add-on TermDBs (available from Language Automation)

User-defined TermDBs (created with the tpbuilder utility, explained in the next section).

TermDBs, together with WebPlexer's WPReplace tag, allow multilingual terminology to be centralized. This has several advantages:

It makes it easy to add support for new languages without changing any of the documents on the site.

Changes to the form or structure of a document can be made immediately available in all languages. All languages can be updated simultaneously.

The number of documents that need to be maintained on the site is reduced. It is not necessary to have separate versions of a document for each language.

A single CGI script or form can be localized for multiple languages from a single copy of source code. No update is required when new languages are added.

TermDBs and the other resources of the Multilingual ToolKit can be used most effectively if you plan appropriately before you design your site. If you need assistance in building your multilingual site, please contact Language Automation and one of our site support engineers will be happy to assist you.

3.6.2.1 Building User-defined TermDBs

User-defined TermDBs can be created and updated using the tpbuilder utility that comes with WebPlexer.

tpbuilder has the following syntax:

tpbuilder <controlFile><outputTermDB>or tpbuilder <controlFile><inputTermDB><outputTermDB>

The first form is used when creating a new TermDB. The second form is used for updating an existing TermDB.

controlFile has the following syntax:

```
# comments
<TermDB title string>
<TermDB table caption>
<TermDB text body>
<blank line>
<masterLanguage>      <encoding>      <input-file>
<language1>           <encoding1>     <input-file1>
<language2>           <encoding2>     <input-file2>
<language3>           <encoding3>     <input-file3>
<language4>           <encoding4>     <input-file4>
<languageN>           <encodingN>     <input-fileN>
``` where

<TermDB title string> is the title string in the generated HTML file.

<TermDB table caption> is the caption of the generated table.

<TermDB text body> is the string inserted before the actual table and is part of the text body.

Note that these strings are for informational and readability purposes only and are not used by WebPlexer.

A line of the form

<languageN><encodingN><input-fileN><comment> specifies the target language, encoding and input file that contains the list of strings to be entered into the TermDB. The first line must specify the TermDB's master language. The master language is used to index into the TermDB using a key. The key is obtained from the string contained between <!—WPReplaceBegin→ and <!—WPReplaceEnd→ tags.

NOTE: the control file and input files must be in the same directory.

For example, a typical control file might look like this:
Joe's TermDB
This is the TermDB for Joe

| Joe's TermDB | | |
|---|---|---|
| english | ISO-8859-1 | laieng.txt |
| chinese | G82312 | laichs.txt |
| french | ISO-8859-1 | laifre.txt |

In this case, english is defined to be the master language of the TermDB and the list of index terms will be taken from the file laieng.txt. The corresponding translations into arabic and french will be read from the files laiarah.txt and laifre.txt, respectively.

The input files have the following syntax:
1:<TermString1>
2:<TermString2>
.
.
.
N:<TermStringN>
where <TermStringN> is a string to be entered into the TermDB for that particular language. Note that the numbers at the beginning of the line are arbitrary and are used to easily align the text across each of the input files.

For example, a typical set of input files might look like this:
English
  1:hello
  2:goodbye
French
  1bonjour
  2:au revoir
Spanish
  1:hola
  2:adios When tpbuilder is run, it will write status information to stdout.

Updating an Existing TermDB

An existing TermDB is updated using this form of the tpbuilder command:
tpbuilder
  <controlFile><inputTermDB><outputTermDB>
NOTE: The controlFile must contain all of the languages that were specified when the TermDB was initially created.

Generally speaking, there are three types of update operations that can be performed on a TermDB.

Adding new entries (and optionally their translations)

Replacing old entries (and optionally their translations)

Deleting entries

These operations are controlled through the contents of the individual input files specified in the controlFile and are described in more detail below.

Adding an Entry

To add a new entry, simply add a new TermString to the master language input file and optionally, corresponding TermStrings in the target language input files. If a matching translation is not found in a target language input file, an empty entry will be created and will be filled in later when the translation is available through the WebPlexer console's translation management feature. Please see section x.xx for further information on console operation.

If an empty TermDB entry is accessed during a lookup, the TermDB will return the value of the original master language string (i.e. the index).

NOTE: Prior to updating a TermDB, it is recommended that TermStrings that will not change be removed from the input files (i.e. input files should only specify actions to be performed during the update).

Replacing an Entry

To replace an entry, simply replace old translation(s) in the target language input files with new translations of the TermString. The original TermString must be specified in the master language input file.

If new translations are not available, simply put a blank line in the target language input file(s) with a number that matches the original TermString in the master language input file. The translations will be updated later through the WebPlexer console's translation management feature.

Deleting an Entry

To delete an entry, simply put a minus sign ('-') in front of the line in the master language input file corresponding to the entry to be deleted. The master language entry for that TermString along with all translations will be removed from the TermDB.

Including HTML Tags in a TermDB Entry

HTML tags can be included in TermStrings to allow complete HTML constructs to be embedded between WPReplace tags. This provides a great deal of freedom in content organization.

Embedded HTML tags must be preceded by a backslash ('\').

For example, the following is a valid TermString:
25:\<img src=∫balloon.gif∫\>
The backslash character can also be used as a valid character in the TermString but it must be preceded by another backslash.

3.6.3 HTML Extensions

The Multilingual ToolKit's HTML extensions are a set of special-purpose commands and comment-embedded HTML tags. They enable WebPlexer to provide special country and language processing when serving a document.

The extensions consist of

1. WPReplace for replacing a text string with its translation from a TermDB.
2. WPSort for sorting lists according to the sort rules of the currently selected language.
3. WPCommands for providing the change language/change country function without the need for CGI scripts or interlinked pages.
4. CustomVars for dynamically inserting language name, country name, and country flag into the HTML.
5. Server-side includes for building documents out of country and language-specific components.

Each of these is described in detail in the following sections.

3.6.3.1 WPReplace

The WPReplace function replaces a string with its translation.

The string to be replaced and the currently selected language are used as search keys within a TermDB. The TermDB is accessed and returns the translation of the string in the specified language.

The WPReplace function is implemented with two tags:
<!—WPReplaceBegin→><!—WPReplaceEnd→

The string to be replaced is enclosed between the tags:
<!—WPReplaceBegin→ String to be replaced
<!—WPReplaceEnd→

The string must be in the primary language of the TermDB (see Section 3.6.2, "TermDBs (tm)").

For example, if a TermDB contained these entries:

| | |
|---|---|
| english | hello |
| french | bonjour |
| spanish | hola | then, this HTML code
<!—WPReplaceBegin→hello<!—WPReplaceEnd→
would produce bonjour if the current language were French, and hola if the current language were Spanish.

Please note the following:

1. If the string is not found in the TermDB, it is not replaced.
2. The WPReplace commands are removed after replacement.

Please see the sample file 'contact.html' included with this release for an example of WPReplace.

Please see Section 4.2.3, "outbound:: Enabling the Output Manager," for information on how to specify TermDBs.

3.6.3.2 WPSort

The WPSort function sorts a list of items according to the sort rules for the current language NOTE: this is restricted in the current release. Please see Section 1.3, "Known Bugs and Limitations of This Release."

The text to be sorted is divided into a series of lines, each of which contains a key.

Line 1 (sort key='box'): <. . . box . . . >
Line 2 (sort key='ball'): <. . . ball . . . >
Line 3 (sort key='car'): <. . . car . . . >

After sorting, the lines will be arranged such that the keys will be in the correct sort order.

Line 1 (sort key ='ball'): <. . . ball . . . >
Line 2 (sort key ='box'): <. . . box . . . >
Line 3 (sort key ='car'): <. . . car . . . >

The WPSort function is implemented with five tags:
<!—WPSortBegin→
<!—WPSortEnd→
<!—WPSortFieldBegin→
<!—WPSortFieldEnd→
<!—WPSortLineEnd→

<!—WPSortBegin→and <!—WPSortEnd→surround the entire block of text to be sorted.

<!—WPSortFieldBegin→and
<!—WPSortFieldEnd→surround the sort key on each line.

<!—WPSortLineEnd→delimits adjacent lines.

NOTE: The first line must start with <!—WPSortBegin→and the last line must end with <!—WPSortEnd→.

WPReplace tags can be included within a sort field, and modify a sort key, if desired.

In the above example, the HTML would be coded as
<!—WPSortBegin→
<. . . <!—WPSortFieldBegin→box
<!—WPSortFieldEnd→. . . ><!—WPSortLineEnd→
<. . . <!—WPSortFieldBegin→ball
<!—WPSortFieldEnd→. . . ><!—WPSortLineEnd→
<. . . <!—WPSortFieldBegin→car
<!—WPSortFieldEnd→. . . >
<!—WPSortEnd→

WPSort can be used to sort a list of languages or countries in local-language order.

For example, consider this bulleted list of languages:
<!—WPSortBegin→
<LI><A HREF="WPCommand?language=english">
<!—WPSortFieldBegin→
<!—WPReplaceBegin→English<!—WPfReplaceEnd→
<!—WPSortFieldEnd→</A>[English]
<!—WPSortLineEnd→
<LI><A HREF="WPCommand?language=french">
<!—WPSortFieldBegin→
<!—WPReplaceBegin→French<!—WPReplaceEnd→
<!—WPSortFieldEnd→</A>[French]
<!—WPSortLineEnd→
<LI><A HREF="WPCommand?language=german">
<!—WPSortFieldBegin→
<!—WPReplaceBegin→German<!—WPReplaceEnd→
<!—WPSortFieldEnd→</A>[German]
<!—WPSortEnd→

This code will allow the list items to be sorted in the correct order, according to the current language.

In the above example, the WPReplace tags are processed first, replacing the words "English", "French", and "German" with their translations. The translations will then be used as the sort keys.

All WPSort tags are removed before sending the result to the browser.

3.6.3.3 WPCommands

WPCommands are special WebPlexer commands included in a document's HTML. They allow WebPlexer to manage country and language selection within a document.

WPCommands are coded as hypertext links in a document. When a link is clicked, the WPCommand is sent to WebPlexer in the request URL.

When WebPlexer receives the WPCommand, it performs some function and returns the result to the browser.

WPCommands have the form:
WPCommand?<command>=<arg>
where <command>is one of 1. link
2. country
3. language and <arg>is a function of <command>.

Each of these commands is described in more detail in the following sections. See also Section 3.3.5, "Manual Language Selection," for a discussion of how WPCommands are used within the HTML.

Link

WPCommand?link=<link_target>

The link command makes a hypertext link to the URL specified by <link_target>. This command has the side effect of notifying WebPlexer that a hypertext link was executed. This information is used to save the location where the browser came from, so it can return after country or language selection.

When WebPlexer receives a link notification, it saves the current value of the referer URL in the http request for this session. After a change country or change language command is executed (see next sections), the saved referer URL is restored and the browser returns to the page from where the link was issued.

The link command is used when the change country or change language function is implemented on a separate page. This allows the browser to return to the originating page once the new country or language is selected. Please see Section 3.3.6.2, "Using WPCommand?link," for additional information.

An example of the link command is included in the sample documents included with this release. The change country and change language functions are implemented in the files 'countsel.html' and 'langsel.html', respectively. These pages are reached by issuing a WPCommand?link=<link_target>from the index and form pages.

Country

WPCommand?country=<new_country>

The country command changes the current country to <new_country>.

The current language may also change depending on the session state. (See Section 3.5.2, "Determine Language from Country").

Language

WPCommand?language=<new_language>

The language command changes the current language to <new_language>.

3.6.3.4 Custom Variables

WebPlexer's custom variables are special placeholders that can be included in HTML code. They are automatically replaced by current country and language information when the document is served to the browser.

Custom variables begin with '&' and must always be enclosed within

<!—WPReplaceBegin→and <!—WPReplaceEnd→ tags.

The next sections describe the custom variables supported in this release. Please see the sample files (e.g. contact.html) for examples of their use.

&country

&country is a placeholder for the translated name of the currently selected country.

The name of the country is translated into the currently selected language.

For example, if the current country were "United-States" and the current language were Spanish, this sequence <!—WPReplaceBegin→&country<!—WPReplaceEnd→ would be converted to

Estados-Unidos.

&language

&language is a placeholder for the translated name of the currently selected language.

The name of the language is translated into the currently selected language.

For example, if the current language were German, this sequence

<!—WPReplaceBegin→&language<!—WPReplaceEnd→ would be converted to

Deutsch.

&flag

&flag is a placeholder for the name of the gif file containing the flag of the currently selected country. The name is automatically prepended with 'flag/'.

The WebPlexer release includes gif images of flags from the countries of the world.

For example, if the current country were Germany, this sequence

<img src=". . . /image/<!—WPReplaceBegin→&flag

<!—WPReplaceEnd→" height=30> would be converted to

<img src=". . . /image/flags/Germany.gif" height=30>

3.6.3.5 Server-Side Includes

An ordinary server-side include is an HTML tag which causes an external file to be included within an HTML document. The file is included when the document is served to the browser.

WebPlexer's server-side include extends this capability by making the decision of what file to include based on the current country, region, or language. This enables a document to be built dynamically out of country and language-specific components.

WebPlexer supports two kinds of server-side includes:

1. Multi-country server-side includes (MCSSI)
2. Multi-language server-side includes (MLSSI)

MCSSI permits locale-specific elements of a document to be included as a function of the current region or country.

MLSSI permits localized elements of a document to be included as a function of the current language.

Multi-Country Server-Side Includes (MCSSI)

The MCSSI feature provides the ability to dynamically insert country and regional-specific content into the HTML stream.

MCSSI is invoked when this construct:

<!—#WP_include_MCSSI "file_name"→ is detected in an HTML document being served to the browser.

When WebPlexer detects this command, it will insert the file

<head_of_mcssi_directory>/<country_or_region_directory>/<file_name> in-line into the HTML stream.

Where:

head_of_mcssi_directory is the top-level directory of the MCSSI area on the server and is defined in the WP_Config file (see Section 4.1, "WP_Config," for more information) and country_or _region is determined dynamically according to the algorithm described in "Determining the country_or _region directory."

The file which is included by MCSSI can itself contain additional WebPlexer tags (such as WPReplace and Custom Variables, see Section 3.6.3.1, "WPReplace," and Section 3.6.3.4, "Custom Variables"). It can also contain additional MCSSI and MLSSI includes (see "Multi-Language Server-Side Includes (MLSSI)").

By supporting WebPlexer tags such as WPReplace within the included MCSSI file, regional-specific content can be further localized according to language. This feature allows considerable flexibility in serving specific content for a region or country where more than one language is spoken.

Please note that language-dependent content is normally not included in MCSSI files and that template tags (see Section 3.6.1.1, "Template Types") such as WPReplace (see Section 3.6.3.1, "WPReplace") or MLSSI (see "Multi-Language Server-Side Includes (MLSSI)") should be used instead.

Language-dependent content means any static text that is present in the file. Including language-dependent content within an MCSSI file is not recommended since an MCSSI file is included based on the setting of the current country. In other words, MCSSI files should contain only country or regional-specific content and be independent of language.

For example, if the current country of the browser is Switzerland, the user might be viewing the site in either French or German. If an MCSSI file for Switzerland is included that contains static text in French, the language will be wrong if the browser is requesting German.

This problem can be easily solved by replacing the static text in the MCSSI file with template tags, either by 1. Placing the translations of the static text in a TermDB, and using WPReplace tags in the MCSSI file, or
2. Placing each language version of the text in a separate file and including it with a single MLSSI tag within the MCSSI file.

Determining the country_or _region_directory

The country_or region_directory is determined dynamically from a combination of the following parameters:

the browser's currently selected country the user-defined region in the WP_Regions file for the selected country the WebPlexer default region for the selected country where the file is located (i.e. whether it is in the primary, secondary, or tertiary directory as defined below).

The specific algorithm for determining the country_or_region_directory from the above information is as follows.

1. The browser's current country is obtained. See Section 3.5, "Country and Language Management," for information on how this is done.
2. The WP_Regions file is consulted to determine if this country is contained within a user-defined region. See Section 4.9, "WP_Regions," for a definition of the syntax of the WP_Regions file.
3. If there is no user-defined region for this country, the WebPlexer pre-defined region is used instead. See Appendix D., "List of WebPlexer Default Regions," for a list of pre-defined regions.
4. WebPlexer will look in 3 locations for the target MCSSI file. These 3 locations are known as the primary, secondary, and tertiary MCSSI directories, respectively.

These directories are consulted in order, one at a time until the requested file is found. The directories are defined below.

a Primary:

<head_of_mcssi_directory>/<current_country>/<mcssi_file>

Example:

Assume a statement of the form:

<!—#WP_include_MCSSI "xyz.html"→ and current country is Japan head_of_mcssi_directory is <docroot_directory>/mcssi.

Then a primary search would look for the file in:

/usr/local/etc/httpd/htdocs/mcssi/Japan/xyz.html b. Secondary:

If the file is not in the primary location, the secondary path will be checked:

<head_of_mcssi_directory>/<current_region>/<mcssi_file> where current_region is either the user-defined or WebPlexer pre-defined (default) region for this country.

Example:

Assume a statement of the form:

<!—#WP_include_MCSSI "xyz.html"→ and current country is Japan current region is Pacific-Rim head_of_mcssi_directory is <docroot_directory>/mcssi.

Then a secondary search would look for the file in:

/usr/local/etc/httpd/htdocs/mcssi/Pacific-Rim/xyz.html c. Tertiary:

If the file is not in the secondary location, the tertiary path will be checked:

<head_of_mcssi_directory>/<mcssi_file>

5. If the mcssi_file is not found in either the primary, secondary, or tertiary locations, the file is considered to be "not found" and the following message will be injected into the HTML stream in place of the MCSSI directive:

[an error occurred while processing MCSSI directive]

Multi-Language Server-Side Includes (MLSSI)

MLSSI allows the Web site designer to further customize an HTML document according to language, more generically than what can be provided by the WPReplace tags (see Section 3.6.3.1, "WPReplace").

Like MCSSI, MLSSI allows a file to be included in-line by referencing it within an HTML document. However, the path to the file is determined by the currently active language, rather than by country or region.

The referenced file is pre-translated and placed in each of the language directories referenced in the WP_Map file (see Section 4.2, "WP_Map," for a description of the WP_Map file). When the HTML document is presented to the browser, the file included by MLSSI is retrieved from the directory corresponding to the currently active language and inserted in-line into the HTML stream. This allows a single HTML document to be easily customized by including components that are specific to the selected language of the browser.

MLSSI is invoked when this construct:

<!—#WP_include_MLSSI "file_name"→ is detected in an HTML document being served to the browser.

When WebPlexer detects this command, it will insert the file

<language_directory>/<file_name> in-line into the HTML stream.

Where:

language_directory is the directory specified in the WP_Map file and language is determined according to the rules outlined in Section 3.5, "Country and Language Management."

The file which is included by MLSSI can itself contain additional WebPlexer tags and commands (such as WPReplace, see Section 3.6.3.1, "WPReplace"). It can also contain additional MLSSI and MCSSI includes.

If the MLSSI file_name is not found on the server, the following message will be injected into the HTML stream in place of the MLSSI directive:

[an error occurred whileprocessing MCSSI directive]

3.7 Multilingual Navigator (tm)

The Multilingual Navigator is a collection of WebPlexer-enhanced HTML code which can be used to easily provide language and country selection for any document on the Web site. It provides complete language and country selection without the need for CGI scripts or complex interlinked pages.

The Multilingual Navigator is easily customizable to meet the specific navigation needs of your site.

The Multilingual Navigator is included with this release in a file called 'mlnav.html'. It is also included on the index.html and contact.html pages in the sample directory.

3.8 Input Manager

WebPlexer's input manager allows forms-handling CGI scripts to be intercepted and user input extracted for later translation. It can be used to support the translation of customer feedback forms in a multilingual environment.

To use the input manager, the name of the CGI script to be intercepted is specified in WebPlexer's WP_Map file along with the location of a template file and an output (.prt-"pre-translated") file.

There is one line at the end of the WP_Map file for each CGI script to be intercepted. The format of this line is:

inbound:: <cgi-name><template-file><.prt file>

Please see the sample WP_Map file included with this release for an example.

The template file tells the input manager which fields of the form should be extracted. When the CGI script is invoked, the input data from those fields is saved and appended to the output, or .prt (pre-translated) file. This file also contains the time stamp, current country and language, and domain of the requester.

3.8.1 Template Definition

The input manager template file has the following format:

```
<FIELD_LIST>
<field1>::L
<field2>::L
<fieldn>::L
<LIST_END>
``` where <FIELD_LIST> and <LIST_END> are required tokens and the remaining lines list the field names used in the HTML form. The '::L' at the end of each line is required.

For example, if an input field in an HTML form were coded as:

<INPUT TYPE="text" NAME="phone" SIZE=40 VALUE=" "> the matching line in the template file would be phone::L

Please see the files 'contact.html' and 'contact.tmpl' included in the sample directory of this release for additional examples.

3.8.2. prt File Description

The .prt file is the output file that contains data from the extracted fields specified in the template file.

Each entry of the file is preceded by the time stamp, current country and language, and host domain.

The .prt files can be queued by the console for later translation. Please see Section 3.10.10, "Maintaining Input Manager Database Files," for more information.

3.9 Document Manager

WebPlexer's document manager manages the selection of documents to serve based on the current country and language. It requires that documents be placed in parallel language directories off of the Web servers htdoc root. It also requires that the location of language directories be specified in the WP_Map file.

The following sections provide additional information.

3.9.1 Arrangement of Documents on the Server

The document manager requires that translated documents be arranged in parallel language directories off of the Web server's htdoc root. Please see Section 3.3, "Language Selection," for detailed information on how to arrange the document hierarchy for the document manager.

3.9.2 SPAMM (Sparse Matrix Manager)

WebPlexer's exclusive document management feature known as "SPAMM" (Sparse Matrix Manager) provides an incremental approach to building a multilingual Web site.

SPAMM allows the site administrator to translate only a portion of documents on the site, and into only those languages that are most relevant.

SPAMM is a feature that makes it unnecessary to fully populate the site's language matrix completely with documents.

If the set of documents on a multilingual Web site is visualized as a matrix, with each row representing a language and each column representing a document, SPAMM eliminates the need to populate every cell of the matrix.

When a document is requested in a particular language, WebPlexer will go to that cell of the matrix and try to retrieve the corresponding document.

If the document is not there (i.e. it has not been translated into the requested language), WebPlexer will automatically retrieve it from the default language directory specified by the "default::" declaration in the WP_Map file for this top-level URL (see Section 4.2, "WP_Map," for an explanation of how to set up the default language directory).

SPAMM is completely transparent in operation. It does not require any special set-up or configuration. It also works with MLSSI so that if an included file cannot be found in the current language directory, it will look in the default directory instead.

Please note that even when SPAMM fetches a document from the default directory, WebPlexer still maintains the correct settings of country and language. This means that if a browser clicks on a link from within a document that was fetched from the default language directory (through SPAMM), WebPlexer will look for the new document in the currently active language directory, not in the default language directory.

3.9.3 Specifying Language-to-Directory Mapping

The mapping of language to directory must be specified in the WP_Map file so the document manager can locate documents in the correct language.

Please see Section 3.3.2.2, "Specifying the Language-to-Directory Map and Charset," for detailed information on how to specify this mapping.

3.9.4 Specifying Charsets

Please see Section 3.3.2.2, "Specifying the Language-to-Directory Map and Charset," for detailed information on how to specify the charset used to encode a document. This information is used by the document manager.

3.9.5 Using Multi-Country Server-Side Includes (MCSSI)

MCSSI allows an HTML document to be easily customized with country and regional-specific content using a highly modular, "building-block" approach. This reduces the number of individual files that need to be kept on the server, lowering the cost and time required to maintain the site.

One application of MCSSI is to insert a targeted, country-specific banner at the top of an HTML page. It can also be used to easily tailor a marketing message for a specific country or region. For example, a travel company could use this feature to publish different airfares to various countries or regions. Or, tour packages or travel information could be presented only to those countries or regions where it is relevant.

The following is a simple example of an HTML document that shows how MCSSI is used.

```
<HTML>
<BODY>
<!—WPReplaceBegin→Welcome to the ABC Travel Site!
<!—WPReplaceEnd→
<!—#WP_include_MCSSI "airfares.html"→
</BODY>
</HTML>
```

When this document is processed, WebPlexer will first determine the current language and replace the string "Welcome to the ABC Travel Site" with its translation out of the TermDB. Please see Section 3.6.3.1, "WPReplace," for a description of WPReplace tags and how the replacement is done. Note that this is not part of the MCSSI operation but is included to make the example a bit more realistic.

Next, WebPlexer will process the MCSSI statement as follows:

1. The currently selected country is determined. Please see Section 3.5, "Country and Language Management," for an explanation of how this is done.
2. The appropriate region that this country belongs to is determined using user-defined regions from the WP_Regions file and/or WebPlexer predefined (default) regions. Please see Section 4.9, "WP_Regions," and "Multi-Country Server-Side Includes (MCSSI)," for more information about how regions are used.
3. Based on the analysis of step 2, the target file, "airfares.html", is fetched from the appropriate directory on the server. Please see "Determining the country_or_region_directory," for a description of how this directory is determined.
4. The target file, "airfares.html" is inserted in-line into the HTML stream. Any WebPlexer tags (e.g. WPReplace) that are included within the file are subsequently processed.

Note that the included MCSSI file can contain additional WebPlexer tags, including MLSSI and WPReplace tags. This allows the MCSSI file to be further customized for the current language, by replacing strings with their translations using the TermDB.

MCSSI is very easy to use by following the steps given below.

1. Determine which countries or regions are important for your site, based on the country-specific or regional-specific content you wish to serve to visitors to your site.
2. Group countries together into those regions of interest and edit the WP_Regions file to identify those regions to WebPlexer. Please see Section 4.9, "WP_Regions," for information on the syntax of the WP_Regions file.
3. Create country and region directories on your server as shown below, and place in those directories, any country-specific or regional-specific parts of a document you wish to have managed by MCSSI.

a. Place country-specific content in these directories:
      <head_of_mcssi_directory>/<country>/<mcssi_file>
   where:
      <head_of_mcssi_directory>
   is the top-level directory of the MCSSI area on the server and is defined in the WP_Config file (see Section 4.1, "WP_Config," for more information).
      <country>
   is the name of the desired country.
      <mcssi_file>
   is the target file to be included.
   b. Place regional-specific content in these directories:
      <head_of_mcssi_directory>/<region>/<mcssi_file>
   where:
      <head_of_mcssi_directory>
   is the top-level directory of the MCSSI area on the server and is defined in the WP_Config file (see Section 4.1, "WP_Config," for more information).
      <region>
   is the name of the desired region. This is either a user-defined region from the WP_Regions file, or a WebPlexer pre-defined region given in Appendix D., "List of WebPlexer Default Regions."
      <mcssi_file>
   is the target file to be included.
   c. Place generic content (all regions and countries) in this directory:
   where:
      <head_of_mcssi_directory>
   is the top-level directory of the MCSSI area on the server and is defined in the WP_Config file (see Section 4.1, "WP_Config").
      <mcssi_file>
   is the target file to be included.

4. Include a statement in your HTML of the form:
      <!—#WP_include_MCSSI "airfares.html"→
where "airfares.html" is the name of the target MCSSI file.
5. When WebPlexer detects the MCSSI include when processing the HTML, it will fetch the file from the appropriate directory (3a, b, or c from above—wherever it finds it first), and insert it in-line into the HTML stream.
6. Any WPReplace or WebPlexer tags that are found in the inserted file will be resolved after the file is inserted.

Please note that language-dependent content is normally not included in MCSSI files and that template tags (see Section 3.6.1.1, "Template Types") such as WPReplace (see Section 3.6.3.1, "WPReplace") or MLSSI (see "Multi-Language Server-Side Includes (MLSSI)") should be used instead.

Language-dependent content means any static text that is present in the file. Including language-dependent content within an MCSSI file is not recommended since an MCSSI file is included based on the setting of the current country. In other words, MCSSI files should contain only country or regional-specific content and be independent of language.

For example, if the current country of the browser is Switzerland, the user might be viewing the site in either French or German. If an MCSSI file for Switzerland is included that contains static text in French, the language will be wrong if the browser is requesting German.

This problem can be easily solved by replacing the static text in the MCSSI file with template tags, either by 1. Placing the translations of the static text in a TermDB, and using WPReplace tags in the MCSSI file, or 2. Placing each language version of the text in a separate file and including it with a single MLSSI tag within the MCSSI file.

3.9.6 Using Multi-Language Server-Side Includes (MLSSI)

MLSSI is typically used to customize an HTML document by including HTML that might be too complex to be managed by WPReplace tags. For example, MLSSI can be used to include a language-specific heading at the top of a form constructed out of WPReplace tags.

Please see Section 3.6.3.1, "WPReplace," for further information about WPReplace tags.

MLSSI also helps to separate the form of a Web site (the structure and layout of the site) from its content (the actual message to be displayed on the browser).

The design and layout of a multi-language site is usually very similar, and often invariant, across languages. MLSSI allows the language-dependent parts of the content to be isolated from the structural design making it easy to update the design of the site and have changes reflected automatically across all of the languages. Likewise, MLSSI allows language content to be easily updated and maintained without affecting the overall site design.

Another application of MLSSI is to include language-specific graphics or image maps within a template file.

For example, a form-based HTML document that is a pure template can be customized with a language-specific banner and graphic at the top of the file as follows:

```
<HTML>
<BODY>
<?--#WP_include_MLSSI "banner.html"-->
<INPUT NAME = "name"><!--WPReplaceBegin-->name
<?--WPReplaceEnd-->
<INPUT NAME = "address"><!--WPReplaceBegin-->address<!--
WpReplaceEnd-->
</BODY>
</HTML>
```

When this file is processed, the file "banner.html" will be fetched from the language directory specified in the WP_Map file (i.e. french/banner.html, german/banner.html, etc.)

The contents of the banner.html files might look something like:

french/banner.html:
    <IMG SRC="images/french/banner.gif" WIDTH=80HEIGHT=20>Bienvenue <br>
german/banner.html:
    <IMG SRC="images/german/banner.gif" WIDTH=100HEIGHT=20>Willkommen <br>
and so on.

Of course, the WPReplace strings ("name", "address") will also be replaced by their translations from the TermDB during processing of the file. See Section 3.6.3.1, "WPReplace," for a description of how this is done.

As can be seen, MLSSI can be used to separate out the language-specific components of an HTML document making it easier to maintain the collection. In the previous example, if the structure of the HTML form needed to change, it would only require changing the template file, and not any of the language-specific files on the site.

MLSSI is very easy to use by following the steps given below.

1. Place any language-specific parts of a document you wish to have managed by MLSSI in the respective language directories specified in the WP_Map file.

2. Include a statement in your HTML of the form:
      <!—#WP_include_MLSSI "component.html"→
   where "component.html" is the name of the file created in step 1.

3. When WebPlexer detects the MLSSI include when processing the HTML, it will fetch the file from the language directory, as defined in the WP_Map file, corresponding to the current language selection, and insert it in-line into the HTML stream.

4. Any WPReplace or WebPlexer tags that are found in the inserted file will be resolved after the file is inserted.

3.9.7 Using CGI Scripts

CGI scripts producing HTML output should be written to be as independent of language and country as possible. This means these scripts should use the HTML extensions provided by the Multilingual ToolKit. They should write out templates that do not contain language-specific or country-specific information. Having only one script to maintain means that changes can be made easily and efficiently.

When the HTML output of such a CGI script is presented to the browser, WebPlexer will fill in the template dynamically with current language and country information. Text that is marked-up with WPReplace tags will also be translated.

In order for WebPlexer to correctly process a CGI script, the filename of the script must be changed when it is referenced in an HTML document. The filename must not include the path to the cgi root, even though the script is actually located in that directory.

In addition, the cgi root must be specified in the WP_Config file (see Section 4.1.18, "cgiRoot").

For example, suppose that the cgi root is "/cgi-bin".

Normally, a reference to a CGI script called "script.cgi" would look like this:
   <A HREF="/cgi-bin/script.cgi">CGI</A>
But with WebPlexer, the cgi root should be omitted:
   <A HREF="script.cgi">CGI</A>
This will ensure correct country and language processing of the HTML.

3.10 WebPlexer Console
   3.10.1 Setting the Console Port
   3.10.2 Setting the Console Password
   3.10.3 Invoking the Console
   3.10.4 Closing the Console
   3.10.5 Writing Console Templates
   3.10.6 Console Commands
3.10.6.1 System Configuration
3.10.6.2 URL Selection
3.10.6.3 System Status
   Status Annunciators
3.10.6.4 Language Status
   Status Annunciators
3.10.6.5 Queue Status
   3.10.7 Translation Queues
3.10.7.1 Enqueue
3.10.7.2 Dequeue
3.10.7.3 Maintaining the Translation Queues
3.10.7.4 Initiating Off-line Translation Using qtrans
   3.10.8 Document Maintenance
3.10.8.1 Including Document Types
3.10.8.2 Including Specific Documents
3.10.8.3 Excluding Documents
   3.10.9 Maintaining TermDBs
   3.10.10 Maintaining Input Manager Database Files
   3.10.11 Log Analysis
3.10.11.1 Usage utility 3.10.11.2 Visits utility 3.11 Runtime Options WebPlexer accepts a number of command line flags used for configuration and debugging. These are described below.

3.11.1 Configuration Flags internetport port serverport port consoleport port

These flags override the InternetPort, ServerPort, and ConsolePort specified in the WP_Config file.

alog file elog file ilog file

These flags override the AccessLog, ErrorLog, and InformationLog specified in the WP_Config file.

c file

This flag specifies a configuration file to use other than the default WP_Config.

version

This flag displays the current version of WebPlexer and libraries.

restart

This flag forces WebPlexer to go through a restart sequence.

3.11.2 Debugging Flags v vv debug

These flags cause WebPlexer to send debugging and informational messages to stderr. They should not be used in normal operation as they will cause some amount of performance degradation. Type ./webplexer -h for more information.

t file

This flag uses the specified file to activate WebPlexer's test mode. The test file contains a list of up to 64 domain suffixes that will be consecutively "spoofed" for each access.

For example, if the file contained:

fr de it the first access would appear to come from France, the next from Germany, and the last from Italy, then the cycle would repeat. Depending on the access pattern, and the contents of the document being retrieved (e.g. if there are embedded graphics), it may be necessary to repeat the same suffix more than once in the file to achieve the desired result.

nobg

This flag tells WebPlexer to run in the foreground and not to fork a child process on startup.

noredirection

This is a debugging flag and should not be used in normal operation.

nosigs

This disables WebPlexer's exception handling. Normally, WebPlexer notifies the client when an exception occurs (if possible).

noforking

This is another debugging flag that forces requests to be handled by the parent process.

-h, -help

These flags list and describe the help options.

4. Contents of WebPlexer Files

The following sections give detailed specifications of all WebPlexer external files.

4.1 WP_Config

The WP_Config file contains site-specific information used to set up and configure WebPlexer.

The WP_Config file is similar in format to a "httpd.conf" file and consists of a series of key/value pairs, one per line.

A key is a non-blank string ending with one or more white spaces. Examples of keys are InternetPort and ServerPort.

A value is a parameter string and varies depending upon the key. Examples of values are the strings "80" and "logs/WPErrorLog".

Keys are separated from values by one or more column delimiters (spaces or tabs). Any text on a line after a comment symbol (#) is ignored.

The key/values currently defined for WP_Config are listed in the sections below.

4.1.1 InternetPort

Syntax:

InternetPort <port> where <port> is the port on the Internet side that WebPlexer monitors for an http request. When WebPlexer is used in "production mode" (see Section 3.1.1.2, "Production Mode"), this value will be 80, the standard http port.

Example:

InternetPort 80

4.1.2 ServerPort

Syntax:

ServerPort <port> where <port> is the port used to communicate with the httpd server. It should be set to an unused port (e.g. 180) when WebPlexer is in "production mode" (see Section 3.1.1.2, "Production Mode"). It must match the port specified in the Web server's configuration file.

Example:

ServerPort 180

4.1.3 ConsolePort

Syntax:

ConsolePort <port> where <port> is the port used to communicate with the WebPlexer console.

Example:

ConsolePort 2800

4.1.4 AccessLog

Syntax:

AccessLog <filename> where <filename> is the name of WebPlexer's access log file. It can be relative to the WebPlexer directory or it can be a fully specified file name.

Example:

AccessLog logs/WPAccessLog 4.1.5 ErrorLog

Syntax:

ErrorLog <filename> where <filename> is the name of WebPlexer's error log file. It can be relative to the WebPlexer directory or it can be a fully specified file name.

Example:

ErrorLog logs/WPErrorLog 4.1.6 InformationLog

Syntax:

InformationLog <filename> where <filename> is the name of WebPlexer's information log file. It can be relative to the WebPlexer directory or it can be a fully specified file name.

Example:
InformationLog logs/WPlnfoLog 4.1.7 ServerName
Syntax:
ServerName <name>
where <name> is the DNS entry name of this server.
Example:
ServerName www.lai.com 4.1.8 RemoteMaintenanceKey
Syntax:
RemoteMaintenanceKey <off I on>
This should be set to "off" in the current release.

4.1.9 Console
Syntax:
Console <off I on>
Disables/enables the WebPlexer console.

4.1.10 MasterLanguage
Syntax:
MasterLanguage <language>
Specifies the language to be used as the master or reference language for the console (i.e. documents in that language will be used as a reference when determining which languages are out of date).
Example:
MasterLanguage english
NOTE: The language must be one of those supported by WebPlexer (see Appendix B., "List of Available Languages").

4.1.11 ConsoleTextExtensions
Syntax:
ConsoleTextExtensions <ext1 ext2 . . . extN>
The extensions specified as extN indicate what filetypes will be under console maintenance functions.
Example:
ConsoleTextExtensions .html .htm 4.1.12 ConsoleFileInclude
Syntax:
ConsoleFileInclude <file1 file2 . . . fileN>
Specifies individual files to be included under console maintenance functions beyond those included using the ConsoleTextExtensions directive.
Example:
ConsoleFileInclude faq.txt info.txt 4.1.13 ConsoleFileExclude
Syntax:
ConsoleFileExclude <file1 file2 . . . fileN>
Specifies individual files to be excluded from console maintenance among the set that was included using the ConsoleTextExtensions directive.
Example:
ConsoleFileExclude dummy.html empty.html 4.1.14 Enqueue
Syntax:
Enqueue <directory>
Specifies the location of the console's enqueue directory.
NOTE: This directory is relative to the DocumentRoot (see below)
Example:
Enqueue enq 4.1.15 Dequeue
Syntax:
Dequeue <directory>
Specifies the location of the console's dequeue directory.
NOTE: This directory is relative to the DocumentRoot (see below)
Example:
Dequeue deq 4.1.16 PlugIns
PlugIns use the WebPlexer API. Information on PlugIns is not available in this release. However, the WP_Config file should contain the following two lines:
PlugIns MLFWI Early 5
Plugins MLFWO Late 5

4.1.17 DocumentRoot
Syntax:
DocumentRoot <path>
where <path> is the path to the Web server's document root.
Example:
DocumentRoot /usr/local/etc/httpd/htdocs/

4.1.18 cgiRoot
Syntax:
cgiRoot <path>
where <path> is the path to the Web server's cgi root, relative to the document root.
NOTE: <path>should not contain a trailing slash.
Example:
cgiRoot/cgi-bin 4.1.19 MCSSIRoot
Syntax:
MCSSIRoot <path>
where <path> is the path to the head of MCSSI directory, relative to the document root.
Example:
MCSSIRoot /webplexer/MCSSI 4.2 WP_Map
The WP_Map file contains a list of top-level URLs that are subject to language selection. URLs are organized in URL groups, and as many groups as necessary can be specified. Each group contains the following information:

1. The top-level URL of the group.
2. The list of languages in the group and the names of the directories where the documents are located.
3. The encodings in which the documents are represented (e.g. ISO-8859-1)
4. Default directories in case the requested language is not found (usually English).
5. TermDB(s) used when processing files for this group.
6. Input Manager files (CGI script, templates, output files) for any forms contained within this group.

The format of the file is as shown below. Any text after a comment symbol (#) is ignored.

```
# URL Group 1 definition
URL::<path1><path_type>
URL::<path2><path_type>
URL::<pathN><path_type>
<language>:<language_directory><charset>
<language>:<language_directory><charset>
default:<default_language><charset>       # REQUIRED
others:<others_language><charset>         # REQUIRED
outbound::'*'<TermDB1.1>
outbound::'*'<TermDB1.2>
outbound::'*'<TermDB1.N>
inbound:: <cgi-script1.1><template-file1.1><.prt file1.1>
inbound:: <cgi-script1.2><template-file1.2><.prt file1.2>
inbound:: <cgi-script1.N><template-file1.N><.prt file1.N>
# URL Group 2 definition
URL::<path1><path_type>
URL::<path2><path_type>
```

-continued

```
URL::<pathN><path_type>
<language>:<language_directory><charset>
<language>:<language_directory><charset>
default:<default_language><charset># REQUIRED
others:<others_language><charset># REQUIRED
outbound::'*'<TermDB2.1>
outbound::'*'<TermDB2.2>
outbound::'*'<TermDB2.N>
inbound::<cgi-script2.1><template-file2.1><.prt file2.1>
inbound::<cgi-script2.2><template-file2.2><.prt file2.2>
inbound::<cgi-script2.N>template-file2.N><.prt file2.N>
# URL Group N definition
defaultCountry <country>
defaultLanguage <language>
```

4.2.1 Specifying the Top-Level URL

Syntax:

URL::<path><path_type> where

<path> is the directory path of the top-level URL below the htdoc root.

<path_type> is either 'd' or 'f' depending on whether the path is a directory or a file.

Examples of valid paths and path_types are:

/d

/user1 d

/user1/docs d

/user1/docs/info.html f

You can specify as many paths as needed within a URL group.

A directory specification only matches a request for that directory. It will not match any requests for files in that directory.

For example,

URL::

/user1 d would match

GET http://www.lai.com/user1

GET http://www.lai.com/user1/ but would NOT match

GET http://www.lai.com/user1/info.html

GET http://www.lai.com/user1/index.html

These would require additional path specifications

URL::/user1/info.html f

URL::/user1/index.html f 4.2.2 Specifying Language/Directory/Charset

Syntax:

<language>: <language_directory><charset> where

<language> is the name of the language.

<language_directory> is the name of the subdirectory containing documents of that language.

<charset> is the encoding used for documents in that language (e.g. ISO-8859-1)

All the URLs in a group share a common language-to-directory map.

NOTE: <language>must be one of the available languages listed in Appendix B., "List of Available Languages."

Examples of valid language to directory entries are:

french: french ISO-8859-1 english: eng_docs ISO-8859-1 catalan: spanish_dir ISO-8859-1 japanese: japanese ISO-2022-JP

There are two reserved <language>names that have special meaning. One is "default" and the other is "others". Both of these must be specified in the directory map of each URL group definition. They are described in more detail below.

4.2.2.1 others:

Syntax:

others: <others_language><charset>

The "others" language is used when the requested language is valid but does not exist on the server.

For example, if English, French, and Spanish documents exist on the server, but the requested language is Russian, WebPlexer will use the language defined as "others".

It is usually the case that "others" is set to English.

Example:

others: english ISO-8859-1

4.2.2.2 default:

Syntax:

default: <default_language><charset>

The "default" language is used when WebPlexer cannot determine the language of a request and none has been specified by the browser. This can happen when the country of origin cannot be determined because the hostname is unavailable or when the requester is behind a firewall.

It is usually the case that "default" is set to English.

Example:

default: english ISO-8859-1

4.2.3 outbound:: Enabling the Output Manager

The output manager (i.e. Multilingual ToolKit) is enabled by specifying TermDB(s) in the WP_Map file for a given top-level URL.

All documents containing templates, tags, or other resources of the Multilingual ToolKit which require dynamic processing will be processed through the listed TermDBs for this URL group.

Syntax:

outbound:: '*' <TermDBN> where

<TermDBN> is the name of a TermDB to be applied for this top-level URL.

NOTE: The TermDB should be in the main WebPlexer directory.

Examples:

outbound:: * master_termdb.html outbound:: * user_termdb.html 4.2.4 inbound:: Enabling the Input Manager To use the input manager, the name of the CGI script to be intercepted is specified in the WP_Map file along with the location of a template file and an output (.prt) file for this URL group.

A separate inbound statement is required for each CGI script.

NOTE: Each inbound statement must specify a different .prt file.

The template file tells the input manager which fields of the form should be extracted. When the CGI script is invoked, the input data from those fields is saved and appended to the output, or .prt (pre-translated) file. This file also contains the time stamp, current country and language, and domain of the requester.

Syntax:

inbound:: <cgi-scriptN><template-fileN><.prt fileN> where

<cgi-scriptN> is the name of the CGI script to be intercepted.

<template-fileN> is the name of the file defining the fields to be captured. Please see Section 3.8.1, "Template Definition," for a definition of this file.

<.prt fileN> is the name of the output (pre-translated) file. Please see Section 3.8.2, ".prt File Description," for a definition of this file.

Examples:

inbound:: forrn.cgi form.tmpl form.prt inbound:: contact.cgi contact.tmpl contact.prt Also see the sample WP_Map file included with this release.

4.2.5 Setting Global Defaults

Global defaults are declared at the end of the WP_Map file and apply to all URL groups.

4.2.5.1 defaultCountry

Syntax:

defaultCountry <country> where

<country> is the country to be used as WebPlexer's global default country.

NOTE: The country must be a valid country from the country.list file.

Example:

defaultcountry United-States

4.2.5.2 defaultLanguage

Syntax:

defaultLanguage <language> where

<language> is the language to be used as WebPlexer's global default language.

NOTE: The language must be a valid language from Appendix B., "List of Available Languages."

Example:

defaultLanguage english

4.3 Map Overrides

WebPlexer provides two files that can optionally force the selection of specific language(s) for certain hostnames or IP addresses when the top-level URL is accessed.

These files are HostNameMap and IPAddrMap, and are described below.

Both files are in WebPlexer's language subdirectory.

4.3.1 HostName Map

---
Syntax:
<hostD1><language_set1>
<hostD2><language_set2>
<host1DN><language_setN>

--- where

<hostID> is a hostname

<language_set> is an ordered list of one or more languages of the form

{<language1>, <language2>, ... , <languageN>} and languageN is preferred over languageN+1 for this hostID.

NOTE: The HostName Map file must be in WebPlexer's 'language' subdirectory.

Examples:

www.lai.com {english} www.generichost.com {default}

4.3.2 IPAddress Map

Syntax:

---
<ipID1<>language_set1>
<ipID2><language_set2>
<ipIDN><language_setN>

--- where

<ipID> is an IP address

<language_set> is an ordered list of one or more languages of the form

{<language1>, <language2>, ... , <languageN>} and languageN is preferred over languageN+1 for this ipID.

NOTE: The IPAddress Map file must be in WebPlexer's 'language' subdirectory.

Example:

192.42.172.9 {farsi, russian, english}

4.4 Log Specifications

WebPlexer supports four log file types:

AccessLog

ErrorLog

InformationLog

UsageLog

The filenames corresponding to these log file types, except for the UsageLog, are defined in the WP_Config file (See Section 4.1.4, "AccessLog," Section 4.1.6, "InformationLog," and Section 4.1.5, "ErrorLog," for additional information). The UsageLog is created and maintained by the usage script, described in Section 3.10.11.1, "Usage utility."

4.4.1 AccessLog

The AccessLog records information about each request received by WebPlexer, such as date, time, and request type.

Each AccessLog entry conforms to the Common Logfile Format:

<remotehost><rfc931><authuser><[date]><"request"><status><bytes> where the fields are defined as follows

<remotehost>

Remote hostname (or IP address if DNS hostname is not available).

<rfc931>

The remote logname of the user.

<authuser>

The username by which the user has authenticated himself.

<[date]>

Date and time of the request.

<"request">

The request line exactly as it came from the client.

<status>

The HTTP status code returned to the client.

<bytes>

The content-length of the document transferred.
  Examples:
    pp93.satcom.net—[28/Jul/1996:23:37:23-0700] "GET/ cnv.post/info.html HTTP/1.0" 302—
    pp93.satcom.net—[28/Jul/1996:23:37:24-0700] "GET/ cnv.post/english-american__United-States/info.html HTTP/1.0" 200 3372
    pp93.satcom.net—[28/Jul/1996:23:37:29-0700] "GET/ cnv.post/coming/flags/United-States.gif HTTP/1.0" 200 3594

NOTE: When WebPlexer is configured for "production mode" (see Section 3.1.1.2, "Production Mode"), WebPlexer's AccessLog should be used in place of the Web server's access log for auditing purposes. The Web server's access log will show all requests originating from WebPlexer.

4.4.2 ErroLog

The ErrorLog logs any errors that occurred during WebPlexer operation, or during the processing of a request.
The format of an ErrorLog entry is:
  [date] <Error-Msg>
  Examples:
    [01/Aug/1996:21:02:23-0700] Couldn't bind to socket for internet port 3080

4.4.3 Information Log

The InformationLog records information about WebPlexer language and country selection. An entry is written whenever language or country changes, whether automatically or by manual selection.
The format of an InformationLog entry is:
  <remotehost><rfc931><authuser><[date]><status-message>
where the fields are defined as follows
  <remotehost>
Remote hostname (or IP address if DNS hostname is not available).
  <rfc931>
The remote logname of the user.
  <authuser>
The username by which the user has authenticated himself.
  <[date]>
Date and time of the request.
  <status-message>
Status information pertaining to country or language processing.
  Examples of InformationLog entries are:
    pc 113.fiz-karlsruhe.de—[01/Aug/1996:01:55:13-0700] Country Selection:
    pc 113.fiz-karlsruhe.de→Germany
    pc 113.fiz-karlsruhe.de—[01/Aug/1996:01:55:13-0700] Language Set:
    pc 113.fiz-karlsruhe.de→{german}
    pc 113.fiz-karlsruhe.de—[01/Aug/1996:01:55:13-0700] Language Selection:
    pc 113.fiz-karlsruhe.de→German

4.4.4 Usage Log

The UsageLog contains a summary of country and language statistics. It is generated from the InformationLog using the usage log analysis tool. The UsageLog can be further processed using the visits log analysis tool. Please see Section 3.10.11, "Log Analysis," for a description of WebPlexer's log analysis tools.
The format of a UsageLog entry is:
  <[date]>
  ><™Language:∫|™Country:∫><language|country>
  <remotehost>
where the fields are defined as follows
  <[date]>
Date and time of the request.
  <language>
New language of this request (i.e. an entry is created when a visitor enters the site or changes language once on the site).
  <country>
New country of this request (i.e. an entry is created when a visitor enters the site or changes country once on the site).
  Examples of UsageLog entries are:
    [17/Oct/1996:13:40:11-0700] Language: German www07.btx.dtag.de
    [17/Oct/1996:14:09:57-0700] Country: Argentina server1.sminter.com.ar

4.5 CountryMap

The CountryMap contains a database of the world's languages and dialects. It is not human-readable.

4.5.1 Creating a User-defined CountryMap

4.6 country.list

The country.list file contains a list of available countries. It is identical to the list included in Appendix C., "List of Available Countries."

4.7 WP_LangCode

The WP_LangCode file contains the iso639 language map.

4.8 WP_Languages

The WP_Languages file contains a list of available languages and dialects. It is identical to the list included in Appendix B., "List of Available Languages."

4.9 WP_Regions

The WP_Regions file consists of a list of names of user-defined regions, each one followed by a list of countries contained within that region.
  Syntax:

```
# this is user-defined region1
<user-defined_region1>::
<country1>
<country2>
<countryN>
# this is user-defined region2
<user-defined_region2>::
<country1>
<country2>
<countryM>
```

Blank lines as well as lines beginning with '#' are ignored. Tabs at the beginning of a line are also ignored.
  Example:
    sales_region1::
      Japan
      China
      Hong-Kong
    sales_region2::
      France
      Great-Britain
      Germany Countries must be chosen from the list of valid countries for WebPlexer. See Appendix C., "List of Available Countries."
The WP_Regions file contains only user-defined regions. WebPlexer also maintains a set of pre-defined (default) regions. These are listed in Appendix D., "List of WebPlexer Default Regions."
"Determining the country_or_region_directory," further describes the interaction and relationship between pre-defined (default) and user-defined regions.

4.10 Master_termdb.html

The Master_termdb is included with the product and contains translations of the names of the world's countries and languages in the following languages and encodings:

| Language | Encoding |
|---|---|
| english | ISO-8859-1 |
| english-american | ISO-8859-1 |
| english-british | ISO-8859-1 |
| arabic | CP1256 |
| portuguese-brazilian | ISO-8859-1 |
| chinese-simplified | GB231 2 |
| chinese-traditional | BIG5 |
| dutch | SO-8859- 1 |
| finnish | ISO-8859-1 |
| french | ISO-8859-1 |
| french-canadian | ISO-8859-1 |
| french-continental | ISO-8859-1 |
| german | ISO-8859-1 |
| greek | CP1253 |
| hebrew | CP1255 |
| indonesian | ISO-8859-1 |
| italian | ISO-8859-1 |
| japanese | x-euc-jp |
| kinyarwanda | ISO-8859-1 |
| kirundi | ISO-8859-1 |
| korean | euc-kr |
| portuguese-continental | ISO-8859-1 |
| russian | CP1251 |
| samoan | ISO-8859-1 |
| spanish | ISO-8859-1 |
| spanish-castilian | ISO-8859-1 |
| spanish-latin-american | ISO-8859-1 |
| swedish | SO-8859-1 |
| thai | CP874 |
| vietnamese | VIASCII |

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A process for managing multilingual translation content and document delivery for a Web site in a computer environment, comprising the steps of:

automatically determining the language and country of a Web site visitor;

directing a Web server to deliver the appropriate localized content contained in one or more country/language databases and/or file systems to said visitors browser;

informing said browser of the proper font and content encoding needed to display the selected language in the requested document, wherein said browser is allowed to download said font from said process;

intercepting input text that is submitted using an HTML form;

writing said input text into a form database in a manner so that it is translated later, wherein said form database includes information to identify the country, language and encoding of said text to interpret it for subsequent translation;

identifying content that needs to be translated and staging the content for offline translation by at least one manual translation resource and at least one automatic translation resource;

dynamically routing and sequencing said content to the at least one manual translation resource and at least one automatic translation resource, wherein said routing and sequencing is performed according to any of: the subject matter of the document to be processed, target language of the translations and whether draft-only or high quality is required; and providing a database viewer which allows the translated content to be viewed in the context of the form in which it was originally entered.

2. The process of claim 1, wherein said determining step determines said visitor's language and country from one or more of the following criteria: the language preference setting in said browser, a cookie from a previous visit to the Web site, the root domain of said visitor, manual language selection by said visitor, the language content available on said server, a local database of countries and languages of the world, or the local configuration files on said Web site.

3. The process of claim 2, wherein said manual language and country selection is implemented through the use of a special embedded command set and without the need for any custom programming or interlinked Hypertext Markup Language (HTML) and allows the user to return to the original document after said selection becomes effective.

4. The process of claim 1, further comprising the step of:
   placing said localized content into a cache if said content is not present in said cache.

5. The process of claim 1, wherein said directing step delivers said localized content from a cache if said content is present in said cache.

6. The process of claim 1, wherein said directing step supports content in all languages and encodings, including Unicode.

7. The process of claim 1, further comprising the step of:
   recording said visitor's country and language preferences in a server log.

8. The process of claim 1, further comprising the step of:
   allowing a user to build a master site that is language and country-independent, wherein the actual language content is placed in one or more language databases.

9. The process of claim 1, further comprising the step of:
   automatically serving said requested document in said visitor's language and for said visitor's region or country by filling in a document template from the master site with the correct language content from one or more language databases.

10. The process of claim 1, further comprising the step of:
    storing the translated document content in one or more language databases, wherein adding a translated document involves translating the appropriate content and creating new entries in said database.

11. The process of claim 1, further comprising the step of:
    storing the translated document content in one or more file systems.

12. The process of claim 1, further comprising the steps of:
    searching down a priority list of languages for a designated country;
    looking for the next most appropriate language if a document in the language that is first on the priority list is not present on one or more servers and/or databases;
    retrieving the content from a default directory if a requested document has not been translated into any of the languages on said list; and
    wherein said list is sorted according to the most prevalent language or dialect for a particular country.

13. The process of claim 12, wherein an informational text message is displayed to a visitor if a document that is first on said priority list is not present on one or more servers and/or databases, wherein said informational text informs said visitor that the preferred language was not available and said informational text is supplied in the most recently valid language for said visitor's country and language.

14. The process of claim 12, wherein said multilingual content is stored hierarchically as country and language independent elements without requiring the storage of individual files that are customized for each locale.

15. The process of claim 1, further comprising the steps of:

creating localized content for specific geographic regions or countries by using a template to dynamically create documents tailored for a specific language or country, wherein said template is language-independent and country-independent and contains placeholder tags and server includes for country and language-specific information that have been removed from a document; and dynamically inserting said information from an external glossary, another template, or document based on the requested language and country of said visitor.

16. The process of claim 1, further comprising the steps of:

providing a parser for creating localized content for specific geographic regions or countries by parsing an ordinary HTML file for translatable text;

retrieving the translations from one or more language databases;

wherein said parser uses a rules-based approach to identify translatable text in an HTML document;

wherein the rules file used by said parser is completely modifiable by the user, said rules file consists of a series of declarations and regular expressions that inform said parser what should be considered as translatable; and wherein the default action for said parser is that if there is no explicit rule, then all text between HTML tags is considered translatable.

17. The process of claim 16, further comprising the steps of:

sequencing the text for translation;

reassembling the translated segments;

wherein each component string is called a segment and each segment has a unique segment ID within a document;

wherein each document has a unique document ID; and wherein the segment ID and the document ID are used together to properly reassemble said translated segments into a composite and correct translation.

18. An apparatus for managing multilingual translation content and document delivery for a Web site in a computer environment, comprising:

a module for automatically determining the language and country of a Web site visitor;

a module for directing a Web server to deliver the appropriate localized content contained in one or more country language databases and/or file systems to said visitor's browser;

a module for informing said browser of the proper font and content encoding needed to display the selected language in the requested document, wherein said browser is allowed to download said font from said apparatus;

a module for intercepting input text that is submitted using an HTML form;

a form database, wherein said input text is written into said form database in a manner so that it is translated later, wherein said form database includes information to identify the country, language and encoding of said text to interpret it for subsequent translation;

identifying content that needs to be translated and staging the content for offline translation by at least one manual translation resource and at least one automatic translation resource;

dynamically routing and sequencing said content to the at least one manual translation resource and at least one automatic translation resource, wherein said routing and sequencing is performed according to any of: the subject matter of the document to be processed, target language of the translation, and whether draft-only or high quality is required; and a database viewer, wherein said viewer allows the translated content to be viewed in the context of the form in which it was originally entered.

19. The apparatus of claim 18, wherein said determining module determines said visitor's language and country from one or more of the following criteria: the language preference setting in said browser, a cookie from a previous visit to the Web site, the root domain of said visitor, manual language selection by said visitor, the language content available on said server, a local database of countries and languages of the world, or the local configuration files on said Web site.

20. The apparatus of claim 19, wherein said manual language and country selection is implemented through the use of a special embedded command set and without the need for any custom programming or interlinked Hypertext Markup Language (HTML) and allows the user to return to the original document after said selection becomes effective.

21. The apparatus of claim 18, further comprising:

a cache, wherein said localized content is placed into said cache if said content is not present in said cache.

22. The apparatus of claim 18, wherein said directing module delivers said localized content from said cache if said content is present in said cache.

23. The apparatus of claim 18, wherein said directing module supports content in all languages and encodings, including Unicode.

24. The apparatus of claim 18, further comprising:

a server log, wherein said visitor's country and language preferences are recorded in said server log.

25. The apparatus of claim 18, further comprising:

a module for allowing a user to build a master site that is language and country-independent, wherein the actual language content is placed in one or more language databases.

26. The apparatus of claim 18, further comprising:

automatically serving said requested document in said visitor's language and for said visitor's region or country by filling in a document template from the master site with the correct language content from one or more language databases.

27. The apparatus of claim 18, further comprising:

one or more language databases, wherein the translated document content is stored in said database(s), wherein adding a translated document involves translating the appropriate content and creating new entries in said database(s).

28. The apparatus of claim 18, further comprising:

a module for storing the translated document content in one or more file systems.

29. The apparatus of claim 18, further comprising:

a module for searching down a priority list of languages for a designated country;

a module for looking for the next most appropriate language if a document in the language that is first on the priority list is not present on one or more servers and/or databases;

a module for retrieving the content from a default directory if a requested document has not been translated into any of the languages on said list; and wherein said list is sorted according to the most prevalent language or dialect for a particular country.

30. The apparatus of claim 29, wherein an informational text message is displayed to a visitor if a document that is first on said priority list is not present on one or more servers and/or databases, wherein said informational text informs said visitor that the preferred language was not available and said informational text is supplied in the most recently valid language for said visitor's country and language.

31. The apparatus of claim 29, wherein said multilingual content is stored hierarchically as country and language independent elements without requiring the storage of individual files that are customized for each locale.

32. The apparatus of claim 18, further comprising:

a module for creating localized content for specific geographic regions or countries by using a template to dynamically create documents tailored for a specific language or country, wherein said template is language-independent and country-independent and contains placeholder tags and server includes for country and language-specific information that have been removed from a document; and a module for dynamically inserting said information from an external glossary, another template, or document based on the requested language and country of said visitor.

33. The apparatus of claim 18, further comprising:

a parser for creating localized content for specific geographic regions or countries by parsing an ordinary HTML file for translatable text;

a module for retrieving the translations from one or more language databases;

wherein said parser uses a rules-based approach to identify translatable text in an HTML document;

wherein the rules file used by said parser is completely modifiable by the user, said rules file consists of a series of declarations and regular expressions that inform said parser what should be considered as translatable; and wherein the default action for said parser is that if there is no explicit rule, then all text between HTML tags is considered translatable.

34. The apparatus of claim 33, further comprising:

a module for sequencing the text strings for translation;

a module for reassembling the translated segments;

wherein each component string is called a segment and each segment has a unique segment ID within a document;

wherein each document has a unique document ID; and wherein the segment ID and the document ID are used together to properly reassemble said translated segments into a composite and correct translation.

35. A program storage medium readable by a computer, tangibly embodying a program of instructions executable by the computer to perform method steps for managing multilingual translation content and document delivery for a Web site in a computer environment, comprising the steps of:

automatically determining the language and country of a Web site visitor;

directing a Web server to deliver the appropriate localized content contained in one or more country/language databases and/or file systems to said visitor's browser;

informing said browser of the proper font and content encoding needed to display the selected language in the requested document, wherein said browser is allowed to download said font from said method;

intercepting input text that is submitted using an HTML form;

writing said input text into a form database in a manner so that it is translated later, wherein said form database includes information to identify the country, language and encoding of said text to interpret it for subsequent translation;

identifying content that needs to be translated and staging the content for offline translation by at least one manual translation resource and at least one automatic translation resource;

dynamically routing and sequencing said content to the at least one manual translation resource and at least one automatic translation resource, wherein said routing and sequencing is performed according to any of: the subject matter of the document to be processed, target language of the translation, and whether draft-only or high quality is required; and providing a database viewer which allows the translated content to be viewed in the context of the form in which it was originally entered.

36. The method of claim 35, wherein said determining step determines said visitor's language and country from one or more of the following criteria: the language preference setting in said browser, a cookie from a previous visit to the Web site, the root domain of said visitor, manual language selection by said visitor, the language content available on said server, a local database of countries and languages of the world, or the local configuration files on said Web site.

37. The method of claim 36, wherein said manual language and country selection is implemented through the use of a special embedded command set and without the need for any custom programming or interlinked Hypertext Markup Language (HTML) and allows the user to return to the original document after said selection becomes effective.

38. The method of claim 35, further comprising the step of:

placing said localized content into a cache if said content is not present in said cache.

39. The method of claim 35, wherein said directing step delivers said localized content from a cache if said content is present in said cache.

40. The method of claim 35, wherein said directing step supports content in all languages and encodings, including Unicode.

41. The method of claim 35, further comprising the step of:

recording said visitor's country and language preferences in a server log.

42. The method of claim 35, further comprising the step of:

allowing a user to build a master site that is language and country-independent, wherein the actual language content is placed in one or more language databases.

43. The method of claim 35, further comprising the step of:

automatically serving said requested document in said visitor's language and for said visitor's region or country by filling in a document template from the master site with the correct language content from one or more language databases.

44. The method of claim 35, further comprising the step of:

storing the translated document content in one or more language databases, wherein adding a translated document involves translating the appropriate content and creating new entries in said database.

45. The method of claim 35, further comprising the step of:

storing the translated document content in one or more file systems.

46. The method of claim 35, further comprising the steps of:

searching down a priority list of languages for a designated country;
  looking for the next most appropriate language if a document in the language that is first on the priority list is not present on one or more servers and/or databases;
  retrieving the content from a default directory if a requested document has not been translated into any of the languages on said list; and
  wherein said list is sorted according to the most prevalent language or dialect for a particular country.

47. The method of claim 46, wherein an informational text message is displayed to a visitor if a document that is first on said priority list is not present on one or more servers and/or databases, wherein said informational text informs said visitor that the preferred language was not available and said informational text is supplied in the most recently valid language for said visitor's country and language.

48. The method of claim 46, wherein said multilingual content is stored hierarchically as country and language independent elements without requiring the storage of individual files that are customized for each locale.

49. The method of claim 35, further comprising the steps of:

creating localized content for specific geographic regions or countries by using a template to dynamically create documents tailored for a specific language or country, wherein said template is language-independent and country-independent and contains placeholder tags and server includes for country and language-specific information that have been removed from a document; and
  dynamically inserting said information from an external glossary, another template, or document based on the requested language and country of said visitor.

50. The method of claim 35, further comprising the steps of:

providing a parser for creating localized content for specific geographic regions or countries by parsing an ordinary HTML file for translatable text;
  retrieving the translations from one or more language databases;
  wherein said parser uses a rules-based approach to identify translatable text in an HTML document;
  wherein the rules file used by said parser is completely modifiable by the user, said rules file consists of a series of declarations and regular expressions that inform said parser what should be considered as translatable; and
  wherein the default action for said parser is that if there is no explicit rule, then all text between HTML tags is considered translatable.

51. The method of claim 50, further comprising the steps of:

sequencing the text for translation;
  reassembling the translated segments;
  wherein each component string is called a segment and each segment has a unique segment ID within a document;
  wherein each document has a unique document ID; and
  wherein the segment ID and the document ID are used together to properly reassemble said translated segments into a composite and correct translation.

* * * * *